United States Patent
Yoon et al.

(10) Patent No.: US 11,301,756 B2
(45) Date of Patent: Apr. 12, 2022

(54) NOVELTY DETECTION USING DEEP LEARNING NEURAL NETWORK

(71) Applicant: MakinaRocks Co., Ltd., Seoul (KR)

(72) Inventors: Andre S. Yoon, Santa Clara, CA (US); Sangwoo Shim, Seoul (KR); Yongsub Lim, Santa Clara, CA (US); Ki Hyun Kim, Yong-in (KR); Byungchan Kim, Seoul (KR); JeongWoo Choi, Seoul (KR); Jongseob Jeon, Gyeonggi-do (KR)

(73) Assignee: MakinaRocks Co., Ltd., Seoul (KR)

( * ) Notice: Subject to any disclaimer, the term of this patent is extended or adjusted under 35 U.S.C. 154(b) by 224 days.

(21) Appl. No.: 16/810,690

(22) Filed: Mar. 5, 2020

(65) Prior Publication Data
US 2020/0320402 A1  Oct. 8, 2020

Related U.S. Application Data

(60) Provisional application No. 62/831,027, filed on Apr. 8, 2019.

(51) Int. Cl.
  *G06N 3/08* (2006.01)
  *G06N 3/04* (2006.01)
(52) U.S. Cl.
  CPC .......... *G06N 3/088* (2013.01); *G06N 3/0454* (2013.01)
(58) Field of Classification Search
  CPC .. G06K 9/6269; G06N 3/0454; G06N 3/0472; G06N 3/088
  See application file for complete search history.

(56) References Cited

U.S. PATENT DOCUMENTS

| | | |
|---|---|---|
| 2018/0033144 A1 | 2/2018 | Risman et al. |
| 2018/0039239 A1* | 2/2018 | Burchard ............. G06N 3/0454 |
| 2018/0082443 A1 | 3/2018 | Risman et al. |

FOREIGN PATENT DOCUMENTS

| | | |
|---|---|---|
| WO | WO 2018/192672 A1 | 10/2018 |
| WO | WO 2018/224669 A1 | 12/2018 |

OTHER PUBLICATIONS

Wang et al, "Generative Neural Networks for Anomaly Detection in Crowded Scenes", Oct. 29, 2018, IEEE Transactions on Information Forensics and Security, vol. 14, Issue: 5, pp. 1390-1399 (Year: 2018).*

(Continued)

*Primary Examiner* — Abdullah Al Kawsar
*Assistant Examiner* — Brent Johnston Hoover
(74) *Attorney, Agent, or Firm* — Knobbe, Martens, Olson & Bear, LLP

(57) ABSTRACT

A method for detecting novelty using an encoder and a decoder comprises: feeding a first input into the encoder and processing the first input through a plurality of encoder layers to generate a first encoded input, wherein processing the first input comprises generating a first intermediate encoded input prior to generating the first encoded input, feeding the first encoded input from the encoder into the decoder and processing the first encoded input through a plurality of decoder layers to generate a first reconstructed output, feeding the first reconstructed output from the decoder as a second or subsequent input into the encoder and processing the first reconstructed output through the plurality of encoder layers, wherein processing the first reconstructed output comprises generating a second intermediate encoded input from the one of the encoder layers, and detecting a novelty based on the first intermediate encoded input and the second intermediate encoded input.

13 Claims, 11 Drawing Sheets

(56) References Cited

OTHER PUBLICATIONS

Notice of Allowance dated Mar. 29, 2021 in counterpart Korean Application No. 10-2020-7021874.
Office Action dated Jan. 13, 2021 in counterpart Korean Application No. 10-2020-7021874.
Kim et al., "RAPP: Novelty Detection With Reconstruction Along Projection Pathway", Published as a conference paper at ICLR 2020, 14 pages, 2020 (also available on line at https://iclr.cc/virtual_2020/poster_HkgeGeBYDB.html.
Abati et al., "Latent Space Autoregression for Novelty Detection", arXiv:1807.01653v2, Mar. 6, 2019 [retrieved on Jun. 25, 2020]. Retrieved from <https://arxiv.org/abs/1807.01653v2>.
Amarbayasgalan et al., "Unsupervised Novelty Detection Using Deep Autoencoders with Density Based Clustering", applied sciences 2018, vol. 8, No. 9, pp. 1-18, Aug. 27, 2018 [retrieved on Jun. 25, 2020]. Retrieved from <https://www.mdpi.com/2076-3417/8/9/1468>.
Chen et al., "Outlier Detection with Autoencoder Ensembles", In: Proceedings of the 2017 SIAM International Conference on Data Mining, pp. 90-98, Apr. 29, 2017.
Xia et al., "Learning Discriminative Reconstructions for Unsupervised Outlier Removal", In: 2015 IEEE International Conference on Computer Vision (ICCV), pp. 1511-1519, Dec. 13, 2015.
Zhang et al., "A Deep Neural Network for Unsupervised Anomaly Detection and Diagnosis in Multivariate Time Series Data", infeaarXiv:1811.08055v1, Nov. 20, 2018 [retrieved on Jun. 25, 2020]. Retrieved from <https://https://arxiv.org/abs/1811.08055v1>.
International Search Report dated Jul. 9, 2020 in Application No. PCT/KR2020/004731.

\* cited by examiner

Input: Sample $x$, autoencoder $A = f \circ g$, and aggregation $s$.
Output: Novelty score $S$.
1  $\hat{x} = A(x)$.
2  $H = \varnothing$.
3  foreach $i$ *in* $1$ *to* $\ell$ do
4  $\quad | \quad H = H \cup \{(g_{:i}(x), g_{:i}(\hat{x}))\}$.
5  end
6  $S = s(H)$.

NOVELTY DETECTION USING DEEP LEARNING NEURAL NETWORK

CROSS-REFERENCE TO RELATED APPLICATIONS

This application claims the benefit of priority to U.S. Provisional Patent Application No. 62/831,027, filed Apr. 8, 2019, entitled "LAYERWISE INFORMATION LOSS-BASED NOVELTY DETECTION," the content of which is hereby incorporated by reference herein in its entirety.

BACKGROUND

Field

The disclosed technology generally relates to novelty detection and more particularly to novelty detection using a deep learning neural network.

Description of the Related Art

Generally, novelty detection refers to data analysis methods or processes that include recognizing a difference between an input, e.g., test data, and previous inputs. The previous inputs can be, e.g., data used during training a learning system such as a neural network. Its practical importance and challenging nature have led researchers to propose many models and approaches. Novelty detection methods are particularly valuable when analyzing datasets in which a relatively large number of examples that can be categorized or labeled as being "normal" (sometime also referred to as positive examples or inliers) is available, while a significantly smaller or insufficient number of examples that can be categorized or labeled as being "abnormal" (sometimes also referred to as negative examples or outliers) is available.

Some novelty detection techniques using deep learning neural networks have been proposed for various applications. In some novelty detection methods, an input is processed through a deep learning neural network to obtain an output that describes the input, and a comparison between the output and the input may be used to determine novelty. However, there is a need for improved novelty detection methods using a deep learning neural network.

SUMMARY

In one aspect, a method for detecting novelty using a deep learning neural network model comprises providing a deep learning neural network model. The deep learning neural network model comprises an encoder comprising a plurality of encoder layers and a decoder comprising a plurality of decoder layers. The method additionally comprises feeding a first input into the encoder and successively processing the first input through the plurality of encoder layers to generate a first encoded input, wherein successively processing the first input comprises generating a first intermediate encoded input from one of the encoder layers prior to generating the first encoded input. The method additionally comprises feeding the first encoded input from the encoder into the decoder and successively processing the first encoded input through the plurality of decoder layers to generate a first reconstructed output. The method additionally comprises feeding the first reconstructed output from the decoder as a second or subsequent input into the encoder and successively processing the first reconstructed output through the plurality of encoder layers, wherein successively processing the first reconstructed output comprises generating a second intermediate encoded input from the one of the encoder layers. The method further comprises detecting a novelty of the original input based on a comparison of the first intermediate encoded input and the second intermediate encoded input.

In another aspect, an electronic apparatus for detecting novelty of a sensor data using a deep learning neural network model comprises a deep learning neural network module comprising an autoencoder, wherein the autoencoder comprises an encoder comprising a plurality of encoder layers and a decoder comprising a plurality of decoder layers. The encoder is configured to receive from a test data generating module a first input comprising a sensor data and to successively process the first input through the plurality of encoder layers to generate a first encoded input, wherein successively processing the first input comprises generating a first intermediate encoded input from one of the encoder layers prior to generating the first encoded input. The decoder is configured to receive the first encoded input from the encoder and to successively process the first encoded input through the plurality of decoder layers to generate a first reconstructed output. The encoder is further configured to receive the first reconstructed output as a second input and to successively process the first reconstructed output through the plurality of encoder layers, wherein successively processing the first reconstructed output comprises generating a second intermediate encoded input from one of the encoder layers. The deep learning neural network module is configured to compute a novelty score of the first input using the first intermediate encoded input and the second intermediate encoded input. The electronic apparatus additionally includes a novelty metric output module configured to output the novelty score.

In another aspect, a non-transitory computer-readable medium has stored thereon executable instruction that when executed cause a computing device to perform steps for detecting novelty of a sensor data using a deep learning neural network model. The steps comprise providing a deep learning neural network model comprising an autoencoder on an electronic device. The autoencoder comprises an encoder comprising a plurality of encoder layers and a decoder comprising a plurality of decoder layers. The steps additionally comprise feeding a first input comprising a sensor data into the encoder and successively processing the first input through the plurality of encoder layers to generate a first encoded input, wherein successively processing the first input comprises generating a first intermediate encoded input from one of the encoder layers prior to generating the first encoded input. The steps additionally comprise feeding the first encoded input into the decoder and successively processing the first encoded input through the plurality of decoder layers to generate a first reconstructed output. The steps additionally comprise feeding the first reconstructed output as a second input into the encoder and successively processing the first reconstructed output through the plurality of encoder layers, wherein successively processing the first reconstructed output comprises generating a second intermediate encoded input from one of the encoder layers. The steps additionally comprise computing a novelty score of the first input using the first intermediate encoded input and the second intermediate encoded input. The steps further comprise outputting the novelty score.

DETAILED DESCRIPTION

Figure 1:
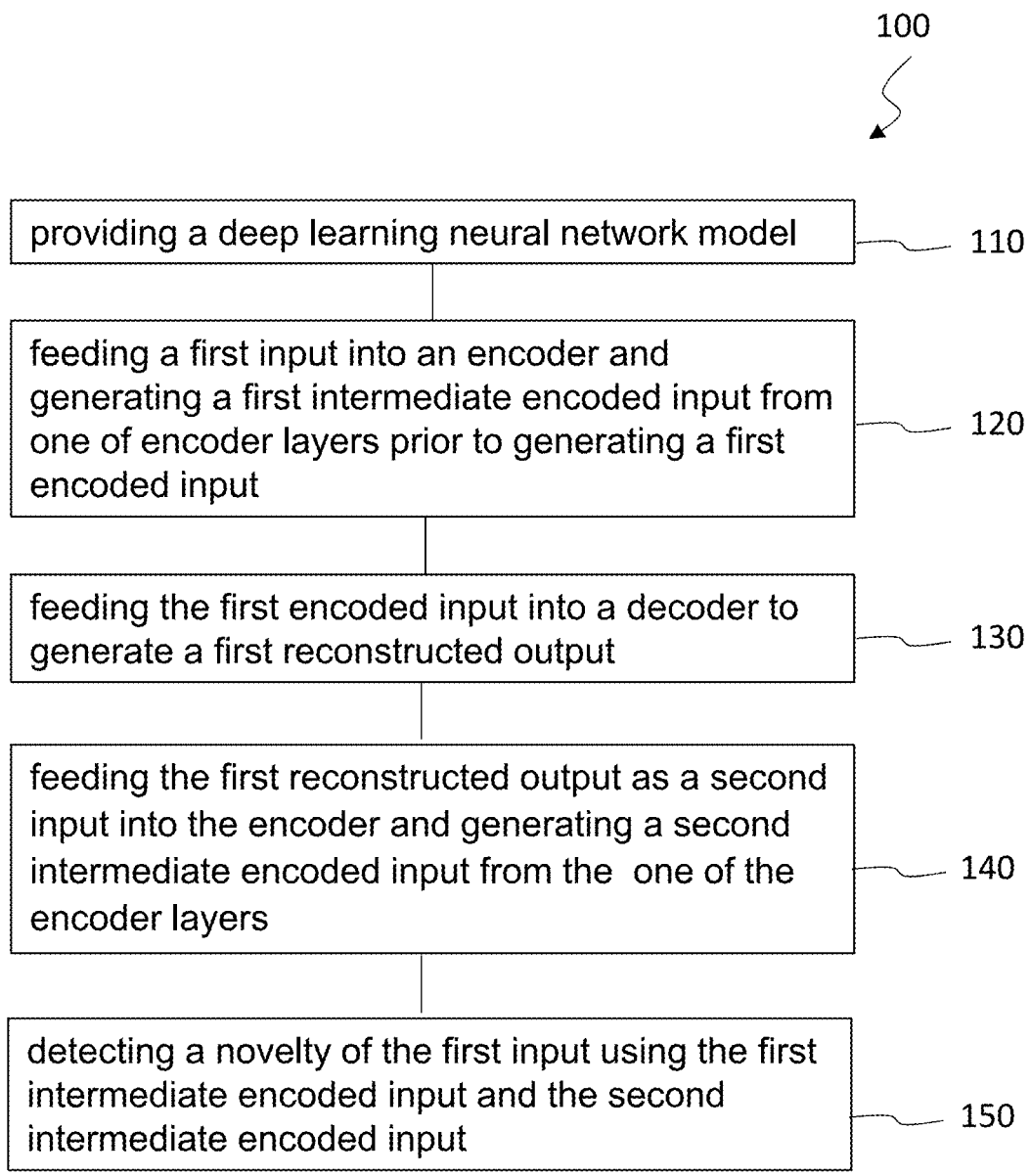
FIG. 1 is a flow chart of a method for detecting novelty using a deep learning neural network, according to embodiments.

Generally, novelty detection refers to data analysis methods or processes that include detecting or recognizing a difference between an input, e.g., data to be tested, and previous inputs. The previous inputs can be, e.g., data used during training a learning system such as a neural network. Novelty detection has gained much research and development attention for application in various systems. Novelty detection can be particularly useful in systems, e.g., mission-critical systems, in which it may be possible to acquire a relatively large data set corresponding to a "normal" class for training a learning system of its behaviors or characteristics, while a data set corresponding to an "abnormal" class may be relatively scarce and therefore difficult to train the learning system of its behaviors or characteristics. In these modern high-integrity systems, only a limited understanding of the relationships between the various system components may be available for training a neural network model. In these systems, a relatively small number of example data sets representing negative instances (e.g., data indicative of abnormal system behavior) may be available. In addition, a relatively large number of possible "abnormal" modes may exist, many of which may not be known a priori, such that training a neural network of their characteristics may be impractical. As a result, conventional multi-class classification schemes may be unsuitable for these applications. A solution to such circumstances may be offered by novelty detection, in which a description of normality is learnt by constructing a model in which a relatively large number of example data sets representing positive instances (e.g., data indicative of normal system behavior) may be relatively easily collected or available. Previously unseen patterns of behaviors or characteristics are then tested by comparing them with a model of normality to detect novelty. A novelty score, which may or may not be probabilistic, may be compared to a decision threshold, based on which the test data may be determined to be "abnormal" if the threshold is exceeded.

In recent years, novelty detection techniques using deep learning neural networks have been proposed for various applications. Some novelty detection methods that use a deep neural network utilize reconstruction error to detect novelty, because discriminative learning schemes are not suitable for highly class-imbalanced data which is common in various applications as described above. Some unsupervised and semi-supervised learning models can handle such imbalance by focusing on characterization of normality and detecting samples out of the normality: e.g., principal component analysis (PCA) for linearity and autoencoders for non-linearity. Variational autoencoders (VAE) have been used to model normality by identifying a lower dimensional space that compressively represents principal information of normal data, and finding data that cannot be effectively represented in that space by measuring a reconstruction error in the original space. Some other novelty detection methods use a generative adversarial network (GAN) to model a distribution of normal data. Despite having the same general objective of discovering a proper lower dimension, GAN uses as a criterion the quality of synthetic data from the low dimensional space rather than reconstruction quality of training data. Some methods combine autoencoders with an adversarial learning scheme, to meet its quality of both dimension reduction and generation. However, the inventors have recognized a shortcoming of some of these methods based on using ordinary reconstruction error, which is that they do not exploit all the information found along a projection pathway, e.g., intermediate outputs by intermediate layers of deep autoencoders.

As described herein, an intermediate output refers to an output generated by a hidden layer of a deep neural network by only partially processing an input therethough, prior to obtaining an output. When the deep neural network includes an autoencoder, an intermediate output can be generated by a hidden layer of an encoder or a decoder of an autoencoder. As describe herein, an intermediate output that is generated by a hidden layer of the encoder of the autoencoder may be referred to as an intermediate encoded input, while an intermediate output that is generated by a hidden layer of the decoder of the autoencoder may be referred to herein as an intermediate decoded output or an intermediate reconstructed output.

Novelty detection methods can be set up differently based on the diversity of normal data in a training data set. For a given labeled data set, in some methods, a small fraction of classes is designated as being normal, while in some other methods, a majority of classes is designated as being normal. The former approach has been used in one class classification context, where evaluation may be performed by organizing training data into collection of samples belonging to a small number of normal classes. On the other hand, the latter approach assumes greater diversity of normal data by constructing a training data set with samples of a relatively large number of normal classes: e.g., nine digits with Modified National Institute of Standards and Technology (MNIST) database.

As described above, in some novelty detection methods, an input is processed through an autoencoder of a deep learning neural network, and a reconstruction error obtained therefrom is used to determine novelty. However, using a reconstruction error to determine novelty can be inadequate for detecting novelty under some circumstances. For example, various novelty detection methods using a deep learning autoencoder measure the quality of reconstruction only in the input space, e.g., by comparing an input with a reconstructed output. That is, such methods do not fully utilize intermediate outputs in the hierarchical hidden spaces by the intermediate layers of the deep learning autoencoder. Such methods can result in a significant loss of valuable information, because outputs by the intermediate layers can yield valuable that maybe lost in the overall reconstructed output by the autoencoder. It will be appreciated that, even if two inputs processed through an autoencoder result in the same reconstructed output, their hidden representations or intermediate outputs by the intermediate layers may not be identical. As a result, in these methods, valuable information from hidden spaces that may be hierarchically identified by the deep architecture may be lost.

To address these and other shortcomings of novelty detection using a deep learning autoencoder, embodiments of novelty detection disclosed herein advantageously include detecting novelty of a data sample by evaluating its reconstruction along a projection pathway, or intermediate encoded or decoded outputs, of the autoencoder. As described herein, a projection pathway refers to a path including a sequence of mappings defined by different layers of the autoencoder. Unlike some novelty detection methods that compare an input and its reconstructed output to detect novelty, various methods according to embodiments extend the space of the comparison into hidden spaces. For example, pairs of hidden representations of the input and its reconstruction are obtained, which may be aggregated to quantify novelty of the input. For example, a pair of hidden representation may include a first intermediate encoded input obtained from an intermediate layer of an encoder by processing an original input through hidden layers of the encoder up to and including that intermediate layer, and a second intermediate encoded input obtained from the same intermediate layer of the encoder by processing a reconstructed output from the autoencoder though the hidden layers of the encoder up to and including the same intermediate layer.

In addition, embodiments of novelty detection disclosed herein can evaluate a reconstruction of a hidden representation of the input. The reconstruction of the hidden representation of the input can be, e.g., an intermediate decoded output that is obtained from processing an input through the autoencoder up to and including an intermediate layer of a decoder. Given an input, the hidden representation of reconstruction of the input that the methods according to embodiments computes can be shown to correspond to reconstruction of hidden representation of the input. It will be appreciated that the latter quantity cannot be computed by directly evaluating its definition because the decoder of an autoencoder is learned as a black box rather than composition of meaningful layer-wise functions. This results in no correspondence between encoding and decoding layers. Nevertheless, according to the methods disclosed herein, a reconstruction of the hidden representation of an input can be computed by feeding a reconstructed output to the autoencoder a second time. Thus, the methods according to embodiments can be interpreted to incorporate reconstructions of hidden representations, as well as to incorporate hidden representations of the input reconstruction.

Novelty Detection Using Intermediate Encoded Input from Hidden Layers

According to various embodiments of novelty detection methods described herein, an autoencoder is used to detect novelty by analyzing information not only in an input space (e.g., an input to be processed through an autoencoder and an output processed completely through the autoencoder), but also by analyzing information in hidden spaces along a projection pathway of the autoencoder. As described above, analyzing information in hidden spaces includes analyzing an intermediate output from a hidden layer after processing an input partially though the autoencoder up to and including the hidden layer. The input and its reconstruction are projected onto the hidden spaces to obtain pairs of hidden vectors, and thus obtained pairs of hidden vectors are aggregated to quantify a relative novelty of the input. A metric that quantifies a difference between the pairs of hidden vectors is then used to determine whether the original input is novel. Advantageously, various embodiments described herein leverage the information generated by an autoencoder more fully compared to methods that mostly utilize an initial input and a final output by exploiting information that can be extracted from hidden spaces to detect novelty of an input. FIG. 1 is a flow chart of a method 100 for detecting novelty of an input, e.g., a sensor data, using a deep learning neural network model, according to embodiments. The method 100 comprises providing 110 a deep learning neural network model comprising a plurality of hidden layers. In the illustrate example, the method 100 comprises providing a deep learning neural network model comprising a plurality of hidden layers. For example, the deep learning neural network can include an autoencoder. An autoencoder comprises an encoder (g) and a decoder (f), each of which can include a plurality of hidden layers. Thus, a deep learning neural network can include an autoencoder, which in turn can include an encoder (g) comprising a plurality of encoder layers $g_1, g_2, \ldots g_\ell$ and a decoder (f) comprising a plurality of decoder layers $f_1, f_2, \ldots f_\ell$. The number of encoder layers and the number of decoder layers can be the same or different. The deep neural network can be provided on an electronic apparatus, e.g., a volatile or a nonvolatile memory or a storage device of a computing device. The deep neural network can also be provided on a non-transitory computer-readable medium, e.g., a nonvolatile memory or a storage medium, which may or may not be part of an electronic apparatus.

Still referring to FIG. 1, the method 100 additionally comprises feeding 120 a first input, e.g., a test data, into the encoder and successively processing the first input through the plurality of encoder layers to generate a first encoded input. Successively processing the first input comprises generating a first intermediate encoded input, after partly processing through the encoder, from one of the encoder layers prior to generating the first encoded input. The first intermediate encoded input may be stored on a non-transitory computer-readable medium, e,g., a nonvolatile memory or a storage medium. The method additionally comprises feeding 130 the first encoded input into the decoder and successively processing the first encoded input through the plurality of decoder layers to generate a first reconstructed output. The method additionally comprises feeding 140 the first reconstructed output as a second input into the encoder and successively processing the first reconstructed output through the plurality of encoder layers. Successively processing the first reconstructed output comprises generating a second intermediate encoded input, after partly processing thorough the encoder, from the one of the encoder layers. The second intermediate encoded input may be stored on the non-transitory computer-readable medium. The method further comprises detecting 150 a novelty of the first input using the first intermediate encoded input and the second intermediate encoded input. For example, the first intermediate encoded input and the second intermediate encoded input stored on the computer-readable medium may be compared using a microprocessor.

The methods according to embodiments use a deep learning neural network model comprising an auto-encoder. As described herein, an autoencoder refers to a neural network that learns to copy its input to its output. That is, an autoencoder is configured to learn a representation for a set of data, e.g., by dimensionality reduction, by training the neural network to ignore signal "noise." An autoencoder has an input layer, an output layer and one or more hidden layers connecting them. The autoencoder has one or more internal (hidden) layer that describes a code used to represent the input, and includes two main parts: an encoder (g) that maps the input into the code, and a decoder (f) that maps the code to a reconstruction of the original input. By doing so, the autoencoder is configured to generate from the reduced encoding a representation as close as possible to its original input. The output layer has the same number of nodes (neurons) as the input layer, and with the purpose of reconstructing its inputs (minimizing the difference between the input and the output) instead of predicting the target value Y given inputs X. Therefore, autoencoders are unsupervised learning models (do not require labeled inputs to enable learning). Autoencoders are restricted to reconstruct the input only approximately, prioritizing the most relevant aspects or characteristics of the data to be copied.

Figure 2:
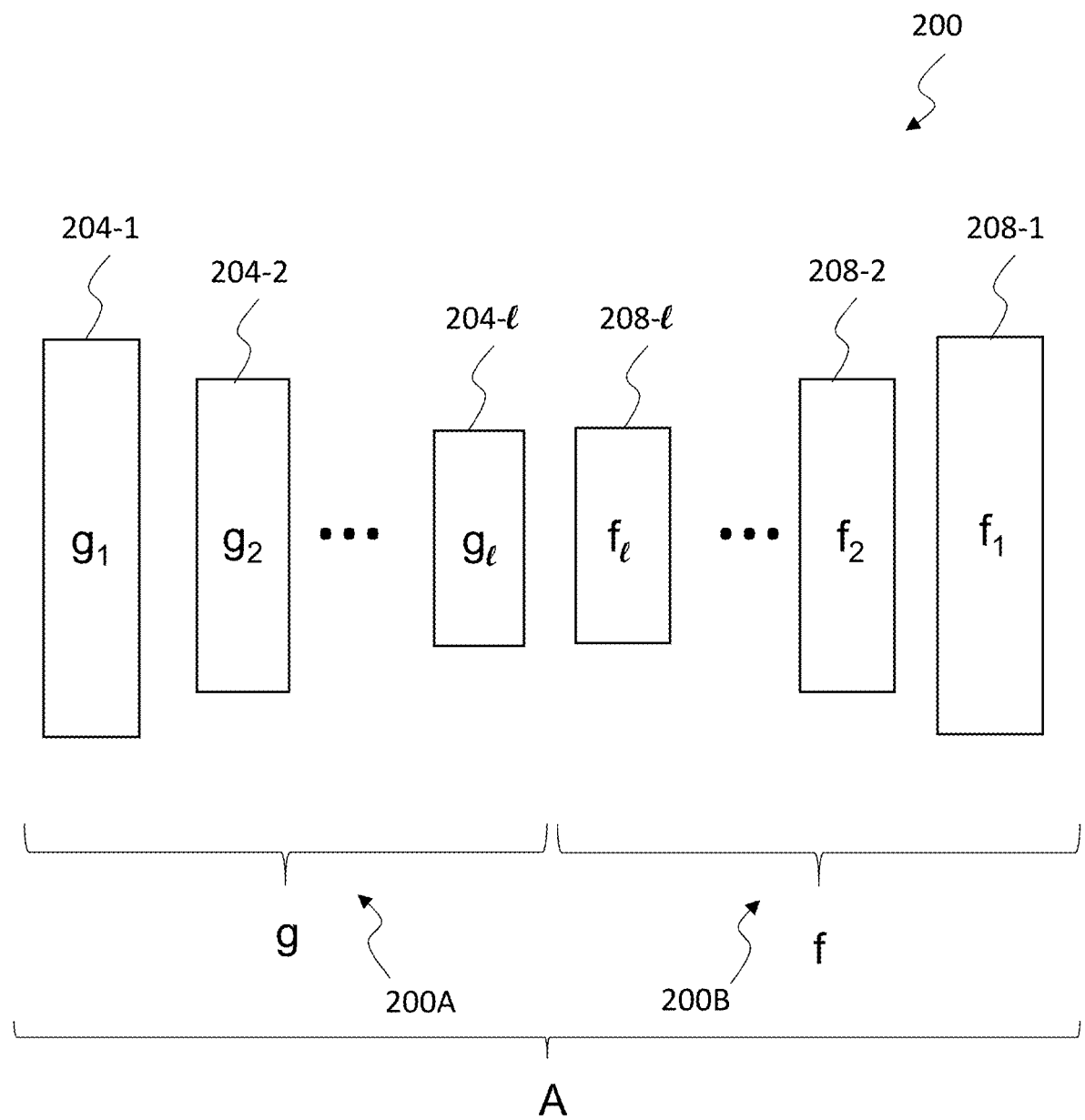
FIG. 2 is a schematic illustration of an autoencoder having a deep learning architecture for detecting novelty, according to embodiments.

FIG. 2 schematically illustrates an example of an auto-encoder (A) 200 having a deep learning architecture for detecting novelty of an input, e.g., a sensor data, according to embodiments. The autoencoder 200 includes an encoder (g) 200A and a decoder (f) 200B. The encoder 200A includes one or more, e.g., a plurality (l), of hidden encoder layers $(g_1, g_2, \ldots g\ell)$ 204-1, 204-2, . . . 204-$\ell$, and the decoder 200B includes one or more, e.g., a plurality ($\ell$), of hidden decoder layers $(f_1, f_2, \ldots f_\ell)$ 208-1, 208-2, . . . 208-$\ell$. In the illustrated embodiment of the encoder 200A, each encoder layer has a plurality of neurons, also referred to herein as nodes or units, and successive encoder layers have successively decreasing number of neurons. Successively decreasing number of neurons can successively decrease the dimensionality of the information processed therethrough. Similarly, in the illustrated embodiment of the decoder 200B, each decoder layer has a plurality of neurons, and successive decoder layers have successively increasing number of neurons. Successively increasing the number of neurons can successively increase the dimensionality of the information processed therethrough. However, embodiments are not so limited and in some other embodiments, the encoder 200A may be configured such that, while the number of neurons in the first encoder layer $(g_1)$ 204-1 is greater than the number of neurons in the last encoder layer $(g\ell)$ 204-$\ell$, the number of neurons in the intermediate layers may not always decrease between immediately adjacent pairs of encoder layers. For example, there may be at least one immediately adjacent pair of encoder layers where the number of neurons increases or remains unchanged from an encoder layer to the immediately subsequent encoder layer. Similarly, in some other embodiments, the decoder 200B may be configured such that, while the number of neurons in the first decoder layer $(f_1)$ 208-1 is greater than the number of neurons in the last decoder layer $(f\ell)$ 208-$\ell$, the number of neurons in the intermediate layers may not always increase between immediately adjacent pairs of encoder layers. For example, there may be at least one immediately adjacent pair of encoder layers where the number of neurons decreases or remains unchanged from an encoder layer to an immediately subsequent decoder layer.

In some configurations, at least some corresponding pairs (e.g., $g_1$ and $f_1$, $g_2$ and $f_1$, . . . $g\ell$ and $f_\ell$) of encoder and decoder layers have the same number of neurons. In some configurations, at least some corresponding pairs of the encoder and decoder layers have different numbers of neurons. However, configurations are not so limited, and in some other configurations, each of the corresponding pairs of the encoder and decoder layers has the same or different number of neurons.

Thus configured, the encoder 200A reduces the number of characteristics or dimensions of its input, e.g., test data, successively through its layers to generate an encoded input, while the decoder 200B increases the number of characteristics or dimensions of its input, e.g., the encoded input, successively through its layers. In the illustrated example, the output of the encoder, referred to herein as the encoded input, serves as the input of the decoder. When arranged as such, the layers of the decoder 200B inversely maps to the layers of the encoder 200A. The overall operation performed by the autoencoder 200 can be expressed as A=f∘g. Each of the encoder layers $(g_1, g_2, \ldots g\ell)$ 204-1, 204-2, . . . 204-$\ell$ is configured to receive from a previous encoder layer an intermediate input and reduce the number of characteristics or the dimensionality thereof by at least one characteristic or dimension to generate an intermediate input for feeding into the next encoder layer. Conversely, each of the decoder layers $(f_1, f_2, \ldots f_\ell)$ 208-1, 208-2, . . . 208-$\ell$ is configured to receive from a previous layer an intermediate reconstructed output and increase the number of characteristics or dimensionality thereof by at least one characteristic or dimension to generate an intermediate reconstructed output for feeding into the next decoder layer. While in the illustrated example, the number ($\ell$) of encoder layers and the number of decoder layers are equal, examples are not so limited, and in other examples, they can be different.

According to various embodiments, the autoencoder 200 can be a suitable autoencoder. For example, without limitation, the autoencoder 200 can be a variational autoencoder (VAE). In contrast to some autoencoders that aim to minimize a distance between an input and a corresponding decoder output, e.g., a reconstructed output from a decoder similar to that described above with respect to FIGS. 1 and 2, a VAE additionally imposes a specified distribution on encoder outputs, e.g., an encoded input from an encoder similar to that described above with respect to FIGS. 1 and 2. For instance, a unit Gaussian distribution may be used for the specified distribution. As a result, an objective function of VAE includes two terms: (1) a distance between an input and a decoder output, in a similar manner to other autoencoders, and (2) a distance between a distribution of an encoder output and the specified distribution.

Another example of the autoencoder 200 is an adversarial autoencoder (AAE). In a similar manner as a VAE, AAE imposes a specified distribution on encoder outputs. However, unlike a VAE, AAE adopts "adversarial training" instead of directly measuring a distance between the distribution of encoder outputs and the specified distribution. For this purpose, AAE uses a neural network known as a discriminator, which is trained to classify encoder outputs and vectors drawn from the specified distribution. As a result, an AAE has three training goals: (1) a pair of an encoder and a decoder are trained similar to other autoencoders, (2) the discriminator is trained to output 1 for vectors drawn from the specified distribution and 0 for encoder outputs, and (3) the encoder is trained to make the discriminator output 1 for encoder outputs.

Another example of the autoencoder 200 is a conditional variational autoencoder (CVAE). CVAE is a variant of VAE, which enables incorporation of auxiliary information associated with data samples, e.g., labels. In addition to VAE, CVAE additionally accepts the associated information, e.g., labels, which may be encoded as a vector, as an input of the encoder or the decoder. This additional input enables interpretation of data samples dependently on their associated information. By way of illustration, the temperature of a manufacturing environment may differ depending on the product being manufactured. In such environment, a product identification may be used as the associated information. It will be appreciated that the associated information can be used as an additional input for any intermediate hidden layers of the encoder and/or the decoder, as well as for the input of the encoder and/or the decoder. Moreover, this technique can be incorporated with AE and other variants of AE.

Referring back to FIG. 1, prior to feeding 120 a first input into an encoder, the autoencoder 200 may be trained. Training objectives of the autoencoder include minimizing a difference between an input x and a reconstructed output A(x). The space represented by the hidden layers of the encoder may be referred to as a latent space. The latent space provides a more concise representation of the input data than the input data itself. As described above, the dataset used to train the autoencoder in novelty detection can be distinguished by a relatively large number of examples of the "normal" condition or positive examples compared to a relatively small or insufficient number of examples of the "abnormalities" or negative examples. Novelty detection is distinguishable from conventional pattern recognition methods, which typically focus on classification of two or more classes. In a general setup of multi-class classification, a set of training examples are provided, where each example may be a D dimensional vector having a label. From the labelled dataset, a function may be constructed such that for a given input, an estimate of one of the multiple labels is obtained. In contrast, the training data set in novelty detection is approached within the framework of one-class classification, in which one class (the specified normal, positive class) has to be distinguished from all other possibilities. It is usually assumed that the positive class is very well sampled, while the other class(es) is/are severely under-sampled. The scarcity of negative examples can be due to high measurement costs, or the low frequency at which abnormal events occur. For example, because precision manufacturing processes are designed to be inherently robust against excursions or outliers, an occurrence of an "abnormal" behavior may be rare and/or expensive to generate intentionally. Therefore, it is difficult to obtain a very well-sampled negative or "abnormal" class. Thus, according to embodiments of novelty detection methods described herein, where a novelty threshold $z(s)=k$ is defined as a decision boundary such that x is classified "normal" if $z(x) \leq k$, or "novel" otherwise, the data set used to train the autoencoder may have less than 10%, less than 5%, less than 1%, less than 0.1%, less than 0.01% that are "novel."

In some novelty detection methods, upon training an autoencoder using normal data samples, a novelty of a test data sample can be measured and represented by a reconstruction error E defined in the input space as:

$$\epsilon = \|x - A(x)\|_2 = \sqrt{\sum_{i=1}^{n}(x_i - A(x)_i)^2},$$

where $x_i$ is an element of an input vector and $A(x)_i$ is a reconstructed output of the $x_i$ processed through an autoencoder.

A sample may be determined to be more likely to be novel as the reconstruction error becomes larger because the sample is farther from the manifold identified by the autoencoder in the input space. However, as described above, the inventors have discovered that the reconstruction error obtained from a fully reconstructed output may not fully exploit information that may be generated by a trained autoencoder, especially when the architecture is deep, in part because hierarchical information identified by the deep architecture may not be utilized. Thus, by performing steps 120, 130, 140 and 150 of the method 100 illustrated in FIG. 1, various novelty detection methods according to embodiments measure a reconstruction-based novelty using information obtained not only in an input space, e.g., information obtained by processing an input completely processing through an autoencoder, but also using information obtained from hidden spaces, e.g., information obtained by processing an input partly through the autoencoder, thus by examining a projection pathway of the autoencoder. In particular, as described herein, the input and a reconstructed output are projected onto the hidden spaces to obtain pairs of hidden vectors from a hidden layer of the autoencoder, and are aggregated to quantify a novelty of the input.

Alternatively, an intermediate reconstructed output may be used to quantify a degree of novelty of an input. That is, an intermediate encoded input and the corresponding intermediate reconstructed output may be compared to quantify the degree of novelty. To make the comparison a proper comparison, the autoencoder may be trained, where the training objective function of the autoencoder may include a term minimizing a difference between an intermediate encoded input and an intermediate reconstructed output involved in the comparison for the novelty quantification.

Figure 3:
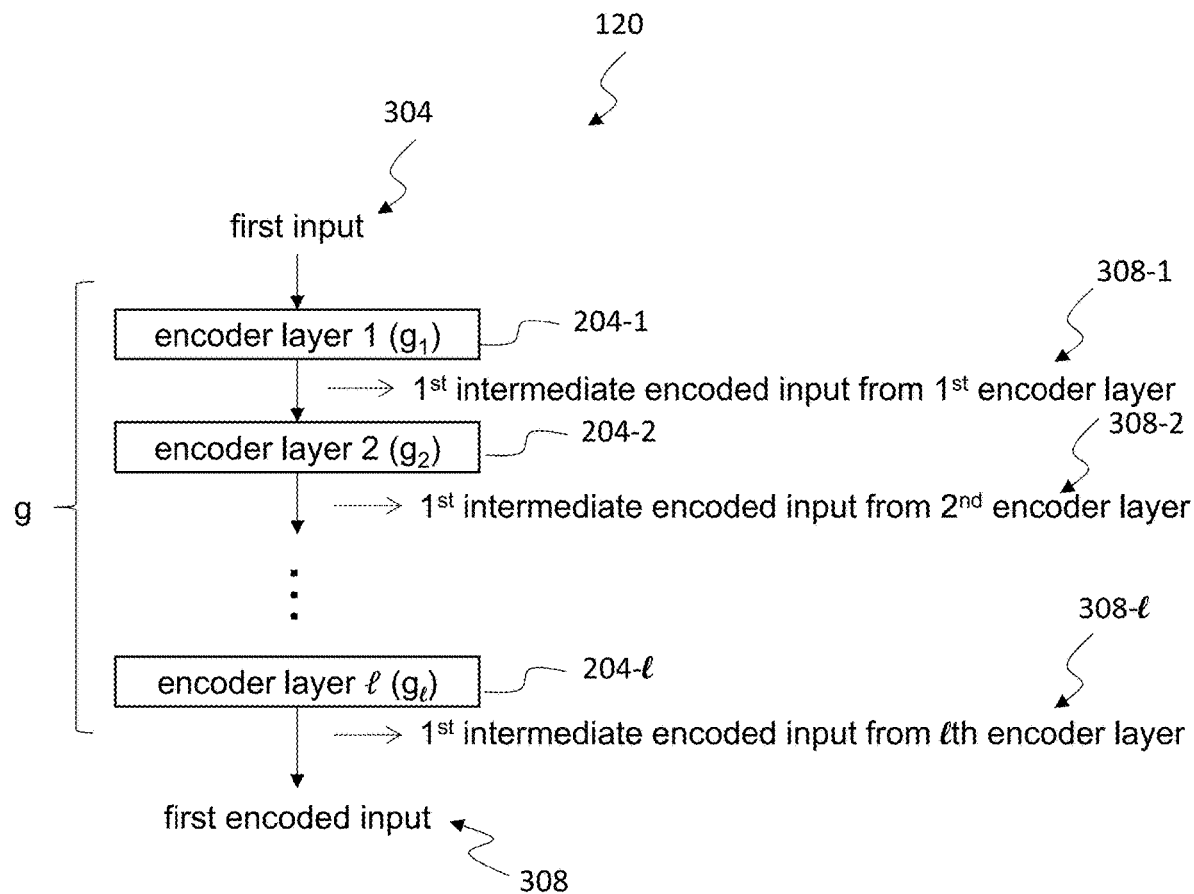
FIG. 3 is a flow chart of a method of processing a first input, which may be a sensor data, through a plurality of encoder layers to generate one or more first intermediate encoded inputs, according to embodiments.

FIG. 3 is a flow chart of a method of processing a first input, which may be a sensor data, through a plurality of encoder layers to generate one or more first intermediate encoded inputs, according to embodiments. FIG. 3 illustrates feeding 120 (FIG. 1) a first input 304, e.g., a sensor data, into the encoder g and successively processing the first input 304 through the plurality ($\ell$) of encoder layers ($g_1$, $g_2$, ... $g\ell$) 204-1, 204-1, ... 204-$\ell$ to generate a first encoded input 308. One or more intermediate first encoded inputs 308-1, 308-2, ... 308$\ell$ to be used for novelty detection are generated by processing the first input 304 partly through the encoder (g) up to and including a corresponding one of the encoder layers 204-1, 204-1, . . . 204-ℓ, prior to generating the first encoded input 308 that is obtained after the first input 304 is processed completely through the encoder (g). Unlike some novelty detection techniques in which the first input 304 may be compared against the first reconstructed output 404 (FIG. 4) to determine a novelty of the first input 304, e.g., by obtaining a novelty score, according to embodiments, one or more of the intermediate first encoded inputs 308-1, 308-2, . . . 308-ℓ may be stored in, e.g., a memory or a storage device, for later use in determining novelty, e.g., by comparing against corresponding ones of second encoded inputs 508-1, 508-2, . . . 508-ℓ (FIG. 5). In the illustrated embodiment, one or more of the first encoded inputs 308-1, 308-2, . . . 308-ℓ may be generated from corresponding one or more of the encoder layers 204-1, 204-1, . . . 204-ℓ prior to generating the first encoded input 308. The first input 304 comprises a dataset, e.g., a sensor data represented by one or more vectors, having an initial number ($D_0$) of characteristics or dimensions, where each of the characteristics or dimensions can correspond to a physical parameter or feature represented by the dataset. As illustrated, the first input 304 is fed into a first encoder layer ($g_1$) 204-1 to generate a first intermediate encoded input 308-1 from the $g_1$, which is compressed relative to the first input 304 by the hidden neurons, units or nodes of the $g_1$ 204-1 to have a first number ($D_1$) of characteristics or dimensions, where $D_1 < D_0$. Subsequently, the first intermediate encoded input 308-1 from the $g_1$ 204-1 is fed into a second encoder layer ($g_2$) 204-2 to generate a first intermediate encoded input 308-2 from the $g_2$ 204-2, which is compressed relative to the first intermediate encoded input 308-1 from the $g_1$ 204-1 by the hidden neurons of the $g_2$ 204-2 to have a second number ($D_2$) of characteristics or dimensions, where $D_2 < D_1$. That is, as the first input 304 is processed through hidden successive encoder layers, the number of characteristics or dimensions is successively reduced. The characteristics or dimensions can correspond to different parameters contained in the sensor data. The process is repeated until a first intermediate encoded input 308-(ℓ-1) from an (ℓ-1)th layer $g_{(\ell-1)}$ having an (ℓ-1)th number (Dℓ) of characteristics is fed into an ℓth encoder layer gℓ 204-ℓ to generate a first intermediate encoded input 308-ℓ from the gℓ, which is compressed by the hidden neurons of the gℓ to have an ℓth number (Dℓ) number of characteristics, where Dℓ < D(ℓ-1). When the ℓth encoder layer (gℓ) 204-ℓ is the last encoder layer of the encoder g, the first intermediate encoded input 308-ℓ from the gℓ 204-ℓ can represent the first encoded input 308, which is subsequently fed into the decoder f, as described above and further in detail below with respect to FIG. 4.

Figure 4:
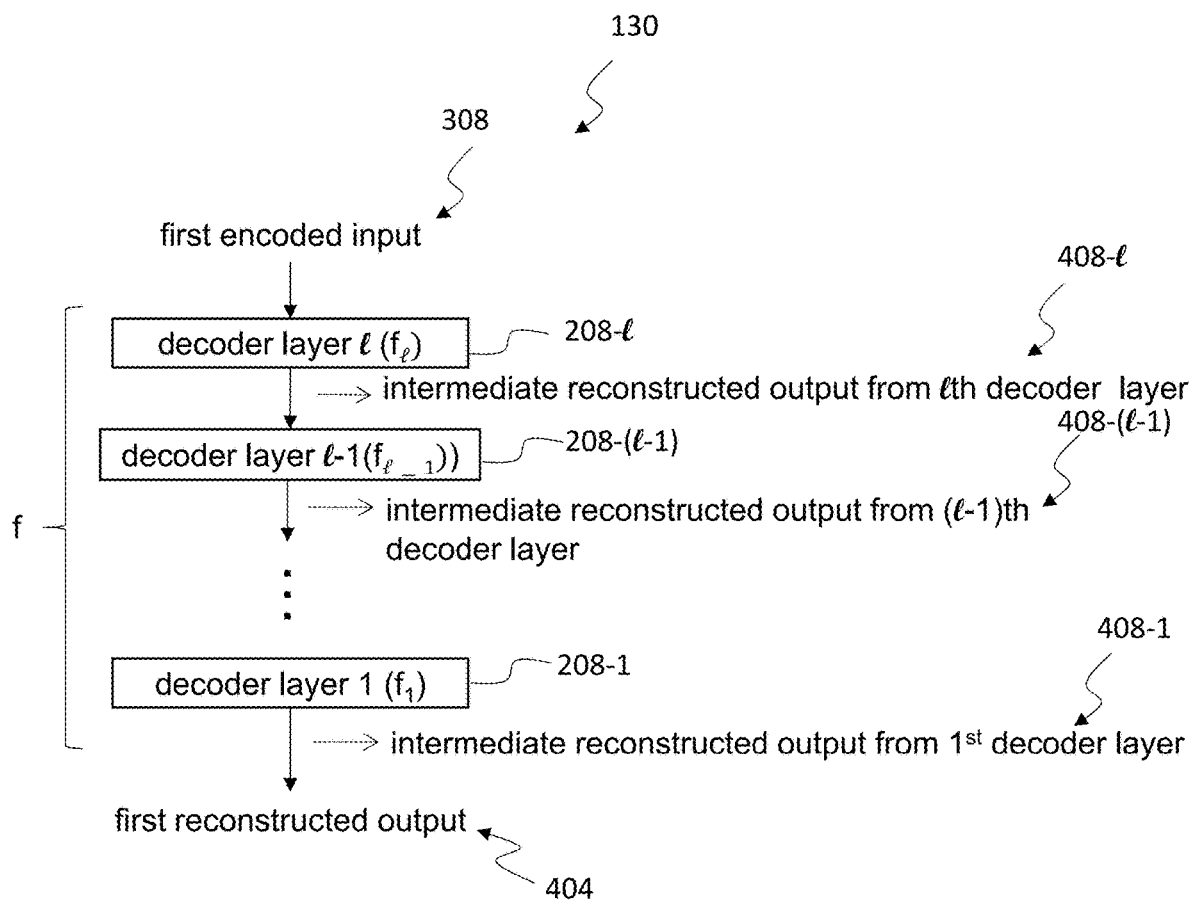
FIG. 4 is a flow chart of a method of processing a first encoded input, which may be generated by an encoder as illustrated in FIG. 3, through a plurality of decoder layers to generate a first reconstructed output, according to embodiments.
Figure 5:
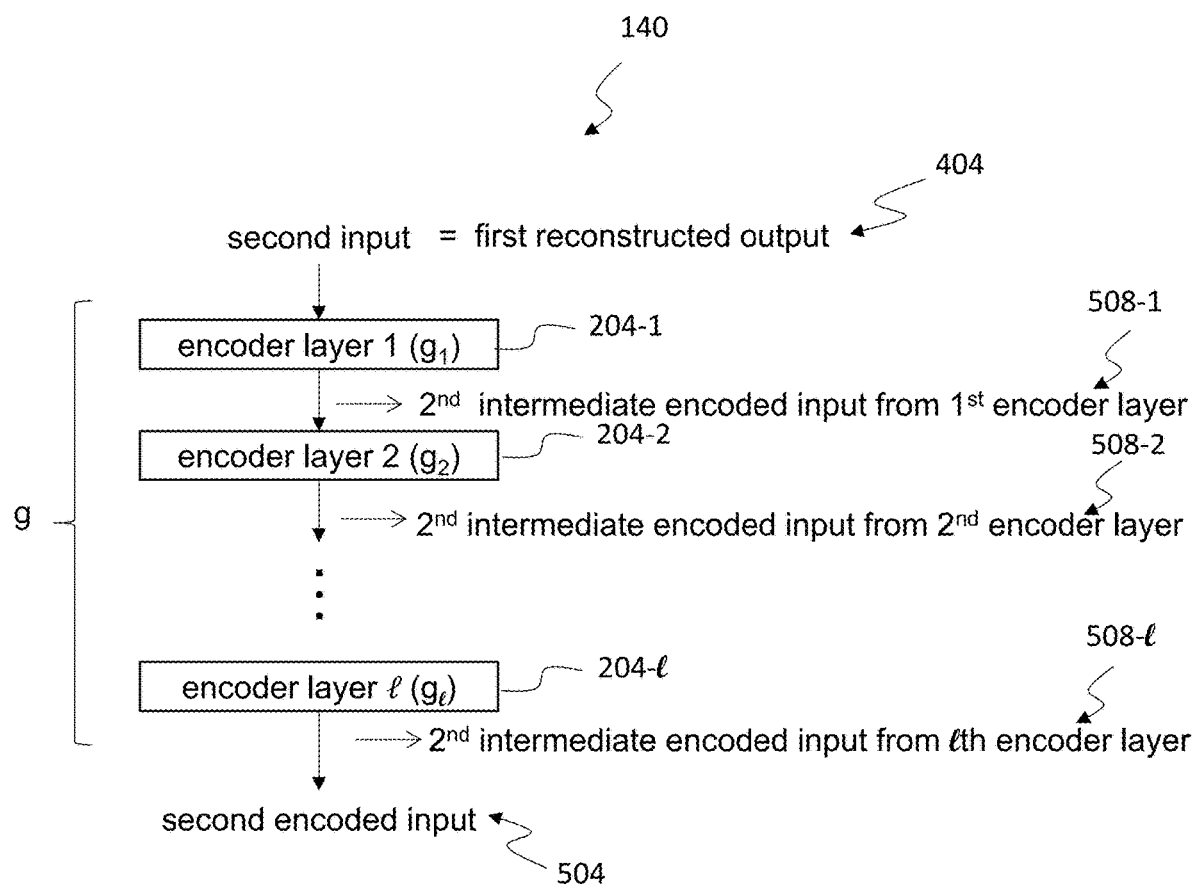
FIG. 5 is a flow chart of a method of processing a first reconstructed output, which may be generated by a decoder as illustrated in FIG. 4, through the plurality of encoder layers to generate one or more second intermediate encoded inputs, according to embodiments.

FIG. 4 is a flow chart of a method of processing a first encoded input, which may be generated by an encoder as illustrated in FIG. 3, through a plurality of decoder layers to generate a first reconstructed output, according to embodiments. FIG. 4 illustrates feeding 130 (FIG. 1) the first encoded input 308 generated by the encoder g as illustrated in FIG. 3 into the decoder f and successively processing the first encoded input 308 through the plurality (ℓ) of decoder layers ($f_\ell$, $f_{\ell-1}$, . . . $f_1$) 208-ℓ, 208-(ℓ-1), . . . 208-1 to generate a first reconstructed output 404. One or more intermediate reconstructed outputs 408-ℓ, 408-(ℓ-1), . . . 408-1 to be fed back into the encoder g is generated by processing the first encoded input 308 partly through the decoder (f) up to and including a corresponding one of the decoder layers 208-ℓ, 208-(ℓ-1), . . . 208-1 prior to generating the first reconstructed output 404 that is obtained after the first encoded input 308 is processed completely through the decoder (f). Similar to intermediate encoded inputs, one or more of the intermediate reconstructed outputs 408-ℓ, 408-(ℓ-1), . . . 408-1 may be stored, e.g., in a memory or a storage device, for later use in determining novelty. In the illustrated embodiment, one or more of the intermediate reconstructed outputs 408-ℓ, 408-(ℓ-1), . . . 408-1 may be generated from corresponding one or more of the decoder layers 208-ℓ, 208-(ℓ-1), . . . 208-1 prior to generating the first reconstructed output 404. The first encoded input 308 comprises a dataset, e.g., compressed sensor data represented by one or more vectors having an ℓth number (Dℓ) of characteristics or dimensions, where each of the characteristics or dimensions can correspond to a reconstructed physical parameter or feature represented by the dataset. As illustrated, the first encoded input 308 having an ℓth number (Dℓ) of characteristics is fed into an ℓth decoder layer (fℓ) 208-ℓ to generate the intermediate reconstructed output 408-ℓ from the fℓ 208-ℓ, which is decompressed relative to the first encoded input 308 by hidden neurons, units or nodes of the fℓ 208-ℓ to have an (ℓ-1)th number (D(ℓ-1)) of characteristics or dimensions, where D(ℓ-1) > Dℓ. Subsequently, the ℓth intermediate reconstructed output 208-ℓ from the fℓ 208-ℓ is fed into an (ℓ-1)th decoder layer $f_{(\ell-1)}$ 208-(ℓ-1) to generate the intermediate reconstructed output 408-(ℓ-1) from the $f_{(\ell-1)}$ 208-(ℓ-1), which is decompressed by the hidden neurons of the $f_{(\ell-1)}$ 208-(ℓ-1) to have D(ℓ-2) number of characteristics, where D(ℓ-2) > D(ℓ-1). That is, as the first encoded input 308 is processed through hidden successive decoder layers, the number of characteristics or dimensions is successively increases. The characteristics or dimensions can correspond to different parameters contained in the sensor data. The process is repeated until the intermediate reconstructed output 408-2 from the $2^{nd}$ decoder layer $f_2$ 208-2 having the D1 number of characteristics is fed into a first decoder layer $f_1$ 208-1 to generate the intermediate reconstructed output 408-1 from the $f_1$ 208-1, which is decompressed by hidden neurons of the $f_1$ to have the $D_0$ number of characteristics, where $D_0 > D_1$. Thus in the illustrated embodiment, the first reconstructed output 404 is reconstructed to have the same number ($D_0$) characteristics or dimensions as the first input 304. When the first decoder layer $f_1$ 208-1 is the last decoder layer of the decoder f, the first intermediate reconstructed output 408-1 from the $f_1$ 208-1 can represent the first reconstructed output 404, which is subsequently fed into the encoder g, as described above and further in below with respect to FIG. 5.

FIG. 5 is a flow chart of a method of processing a first reconstructed output, which may be generated by a decoder as illustrated in FIG. 4, through the plurality of encoder layers to generate one or more second intermediate encoded inputs, according to embodiments. FIG. 5 illustrates feeding 140 (FIG. 1) the first reconstructed output 404, obtained from the decoder f as described above with respect to FIG.

4, as a second input 404 into the encoder (g) and successively processing through the plurality of encoder layers (g$_1$, g$_2$, ... g$\ell$) 204-1, 204-1, ... 204-$\ell$ to generate a second encoded input 504. One or more second intermediate encoded inputs 508-1, 508-2, ... 508$\ell$ to be used for novelty detection are generated by processing the second input 404 partly through the encoder (g) up to and including a corresponding one of the encoder layers 204-1, 204-1, ... 204-$\ell$ in a similar manner as described above with respect to FIG. 3, prior to generating the second encoded input 504. In a similar manner as described above with respect FIG. 3 for feeding the first input 304 into the encoder g to obtain a first encoded input 308, in the illustrated process, the second input 404 is fed into the first encoder layer (g$_1$) 204-1 to generate the second intermediate encoded input 508-1 from the g$_1$, the second intermediate encoded input 508-1 from the g$_1$ is fed into a second encoder layer (g$_2$) 204-2 to generate a second intermediate encoded input 508-2 from the g$_2$, and so on, until a second intermediate encoded input 508-($\ell$-1) from the ($\ell$-1)th encoder layer g$_{(\ell-1)}$ 204-($\ell$-1) is fed into the $\ell$th encoder layer (g$\ell$) 204-$\ell$ to generate a second intermediate encoded input 508-$\ell$ from the g$\ell$ 204-$\ell$, which can represent the second encoded input 504 when the g$\ell$ 204-$\ell$ is the last encoder layer of the encoder g. In a similar manner as described above with respect to FIG. 3, unlike some novelty detection techniques, according to embodiments, one or more of the intermediate second encoded inputs 508-1, 508-2, ... 508-$\ell$ may be stored, e.g., in a memory or a storage device, for later use in determining novelty, e.g., by comparing against corresponding ones of first encoded inputs 308-1, 308-2, ... 308-$\ell$ (FIG. 3)

Thus, as described herein, advantageously, unlike some novelty detection techniques in which the first encoded input 308 (FIG. 3) may be compared against the first reconstructed output 404 (FIG. 4) that is obtained by processing completely through the autoencoder to detect novelty, in the methods according to embodiments, one or more intermediate first encoded inputs 308-1, 308-2, ... 308-$\ell$ (FIG. 3) that have been obtained by processing a first input 304 partly through the encoder been stored in, e.g., a memory or a storage device, may be used in determining novelty, e.g., by comparing against corresponding ones of second encoded inputs 508-1, 508-2, ... 508$\ell$ that have also been obtained by processing the first reconstructed output 404 partly through the encoder to detect novelty, e.g., by calculating a novelty score. Thus, the novelty methods according to embodiments not only utilize the first encoded input 308 (FIG. 3) from the encoder g and the first reconstructed output 404 (FIG. 4) from the decoder f, but also utilizes one or more intermediate first encoded inputs 308-1, 308-2, ... 308-$\ell$ (FIG. 3) and corresponding ones of second encoded inputs 508-1, 508-2, ... 508-$\ell$ (FIG. 5) generated by the corresponding hidden layers. Thus, information generated along the pathway of the autoencoder is more fully utilized.

Novelty Scoring Using Intermediate Encoded Input from Hidden Layers

Figures 6A, 6B:
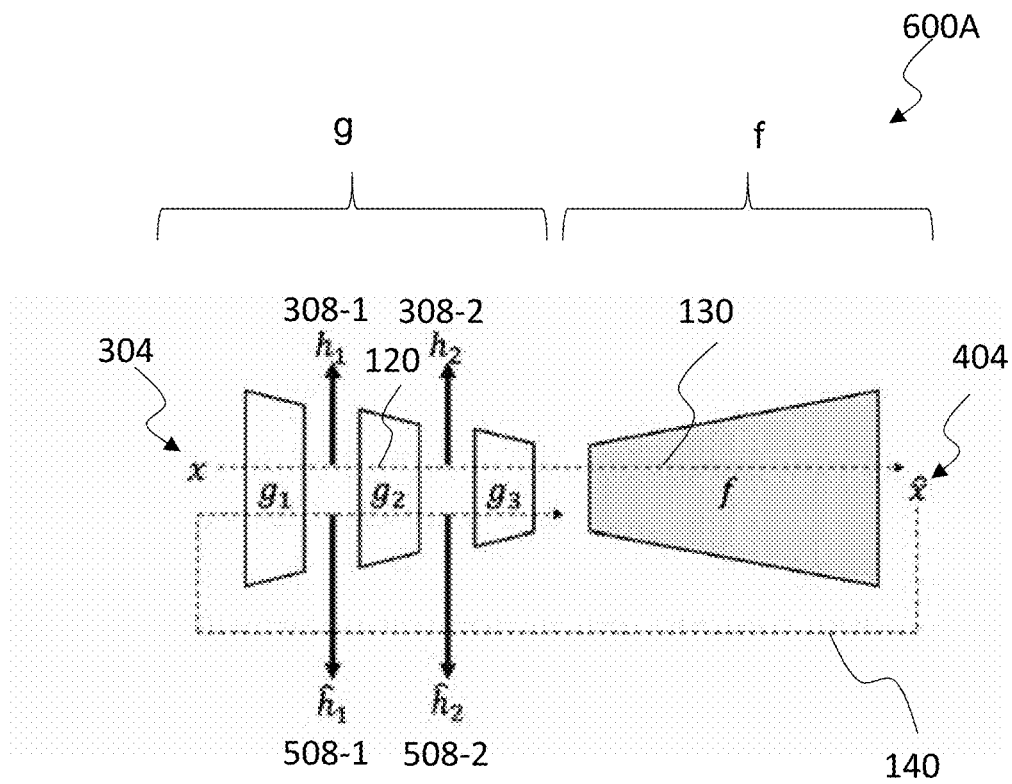
FIG. 6A schematically illustrates a method of quantifying a detected novelty by using one or more pairs of first and second intermediate encoded inputs, which may be generated according to methods illustrated in FIGS. 3-5, according to embodiments.
FIG. 6B is an example algorithm for implementing the method illustrated in FIG. 6A, according to embodiments.

FIG. 6A schematically illustrates a method of quantifying a detected novelty by using one or more pairs of first and second intermediate encoded inputs from an encoder, which may be generated according to methods described with respect to, e.g., FIGS. 3-5, according to embodiments. In reference to FIG. 6A, a method 600A of quantifying a detected novelty by examining the projection pathway of an autoencoder is schematically described. The method 600A illustrates the first input 304 that is fed 120 (FIG. 1) into the encoder g and successively processed through the plurality of encoder layers (g$_1$, g$_2$, ... g$\ell$) to generate a first encoded input 308 according to the method described above with respect to FIG. 3, the first encoded input that is fed 130 (FIG. 1) into the decoder f and successively processed through the plurality of decoder layers (f$_\ell$, f$_{\ell-1}$, ... f$_1$) to generate a first reconstructed output 404 according to the method described above with respect to FIG. 4. The first reconstructed output 404 is then fed 140 (FIG. 1) into the encoder g as a second input and successively processed through the plurality of encoder layers (g$_1$, g$_2$, ... g$\ell$) according to the method described above with respect to FIG. 5. From the first input 304 and the reconstructed output 404 that are projected onto the hidden spaces or layers, e.g., processed partly through the encoder (g) up to and including one of the encoder layers 204-1, 204-1, ... 204-$\ell$, one or more pairs of hidden vectors can be obtained. The pairs of the hidden vectors can then used to obtain a novelty score. For example, the pairs of the hidden vectors may be aggregated to quantify the novelty of the original input.

Referring to FIG. 6A, a mathematical expression of the method 600A may be described as follows. An overall computation performed by an autoencoder 200 (FIG. 2) may be represented as A=f∘g, where g and f are computations performed by an encoder g and a decoder f, respectively. As described above, the encoder g has $\ell$ number of hidden layers g$_1$, g$_2$, ... g$\ell$ each configured to perform its own computation, such that g=g$\ell$ ∘ ... ∘g$_1$. A computation performed by a portion of g having i layers can be expressed as follows:

$$g_{:i} = g_i \circ \cdots \circ g_1$$

for $1 \leq i \leq \ell$. In the illustrated method 600A, the first input 304 (FIG. 3) is represented as x, which may be an input vector, having D$_0$ characteristics or dimensions, and the first reconstructed output 404 (FIG. 4) is represented as $\hat{x}$, which may be a vector representing the reconstruction output computed by A and having the same D$_0$ characteristics or dimensions. That is, $\hat{x}=A(x)$. While in some novelty detection methods, only x and $\hat{x}$ may be compared to detect novelty, various methods according to embodiments obtain projections of x and $\hat{x}$ onto hidden spaces along a projection pathway of A. For example, by feeding x and $\hat{x}$ into A, one or more pairs of vectors 604 represented as (h$_i$, $\hat{h}_i$), may be obtained from the hidden layers 204-1, 204-1, ... 204-$\ell$ (FIGS. 3 and 5), where:

$$h_i(x) = g_{:i}(x),$$

$$\hat{h}_i(x) = g_{:i}(\hat{x}) = g_{:i}(A(x)).$$

That is, each of h$_i$(x) represents a first intermediate encoded input 308-$i$ from an ith layer 204-$i$ of the encoder g as described above with respect to FIG. 3, and each of $\hat{h}_i$(x) represents a second intermediate encoded input 508-$i$ from the ith layer 204-$i$ of the encoder g as described above with respect to FIG. 5.

According to various methods described herein, a novelty score may be obtained using the pairs of vectors obtained as described above. In particular, a novelty score of x may be obtained by aggregating the pairs of vectors to obtain an aggregate H:

$$H(x) = \{(h_i(x), \hat{h}_i(x)) : 1 \leq i \leq \ell\}.$$

The method 600A may also be summarized by an algorithm 600B shown in FIG. 6B, which is an example algorithm for implementing the method illustrated in FIG. 6A, according to embodiments. It will be appreciated that, while the algorithm 600B includes for loop in lines 3-5 to clearly state the variables to construct the H, in practice, the computation may be performed by one feed-forward of each of x and x̂ to g. It will be appreciated that the methods described herein represent generalizations of some reconstruction methods where $g_0$ is defined as the identity function and a novelty score function ($s_{ord}$) can be represented as follows:

$$s_{ord}(H(x)) = \|h_0(x) - \hat{h}_0(x)\|_2^2$$

where $h_0(x) = g_0(x) = x$ and $\hat{h}_0(x) = g_0(x) = \hat{x}$.

In the following, example methods of defining a novelty score are described according to embodiments, which more fully utilize the H compared to the $s_{ord}$. The example methods described herein are particularly advantageous where there is essentially no knowledge about interpretation of identified hidden spaces, which is relatively common in models with deep neural networks. However, examples are not so limited, and more elaborate metrics can be designed if some knowledge regarding hidden spaces is available.

According to some embodiments, novelty scoring includes a simple aggregation along a pathway (SAP). For a data given sample x, the SAP includes summing squares of Euclidean distances for all pairs in H. A novelty score function $s_{NAP}$ using the SAP may be expressed as:

$$s_{SAP}(x) = \sum_{i=0}^{\ell} \|h_i(x) - \hat{h}_i(x)\|_2^2 = \|h(x) - \hat{h}(x)\|_2^2,$$

where h(x) and ĥ(x) are the concatenations of $[h_0(x), \ldots, h_\ell(x)]$ and $[\hat{h}_0(x); \ldots; \hat{h}_\ell(x)]$, respectively.

Although the SAP is intuitive, it may not sufficiently reflect properties of hidden spaces under some circumstances. For example, the SAP may not reflect relative weights of different distances in a distribution of pairs in H. For instance, the magnitude of distances can depend on the hidden layers, or there may exist correlated neurons across layers which may unintentionally be emphasized in SAP.

Figure 7A:
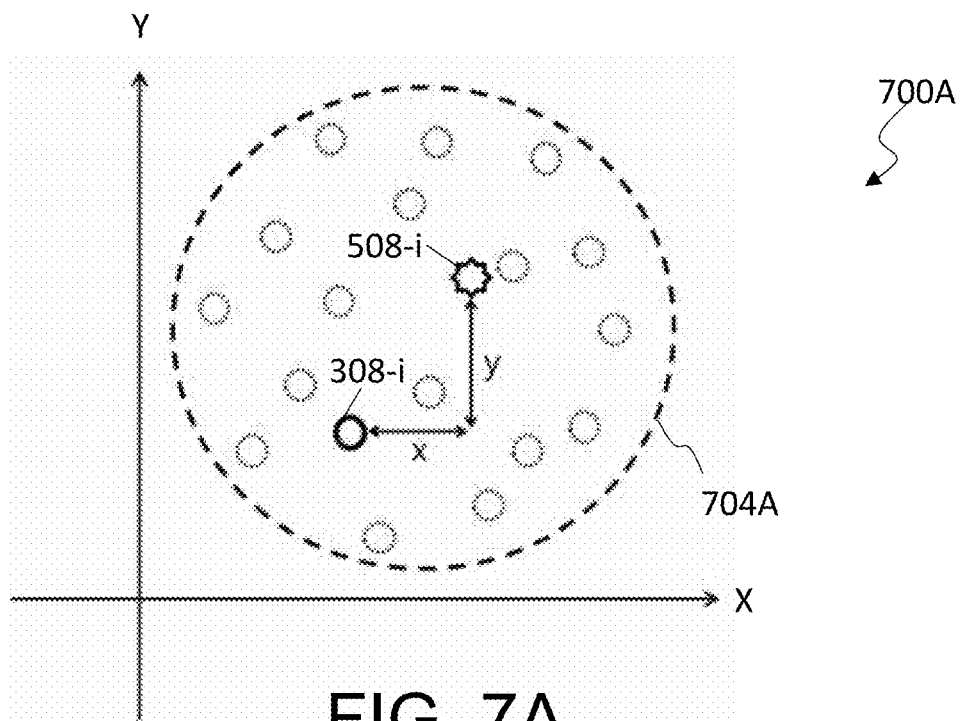
FIG. 7A is a simplified conceptual representation of a distribution of first intermediate encoded inputs and of second intermediate encoded inputs in a vector space under a schematic example circumstance.
Figure 7B:
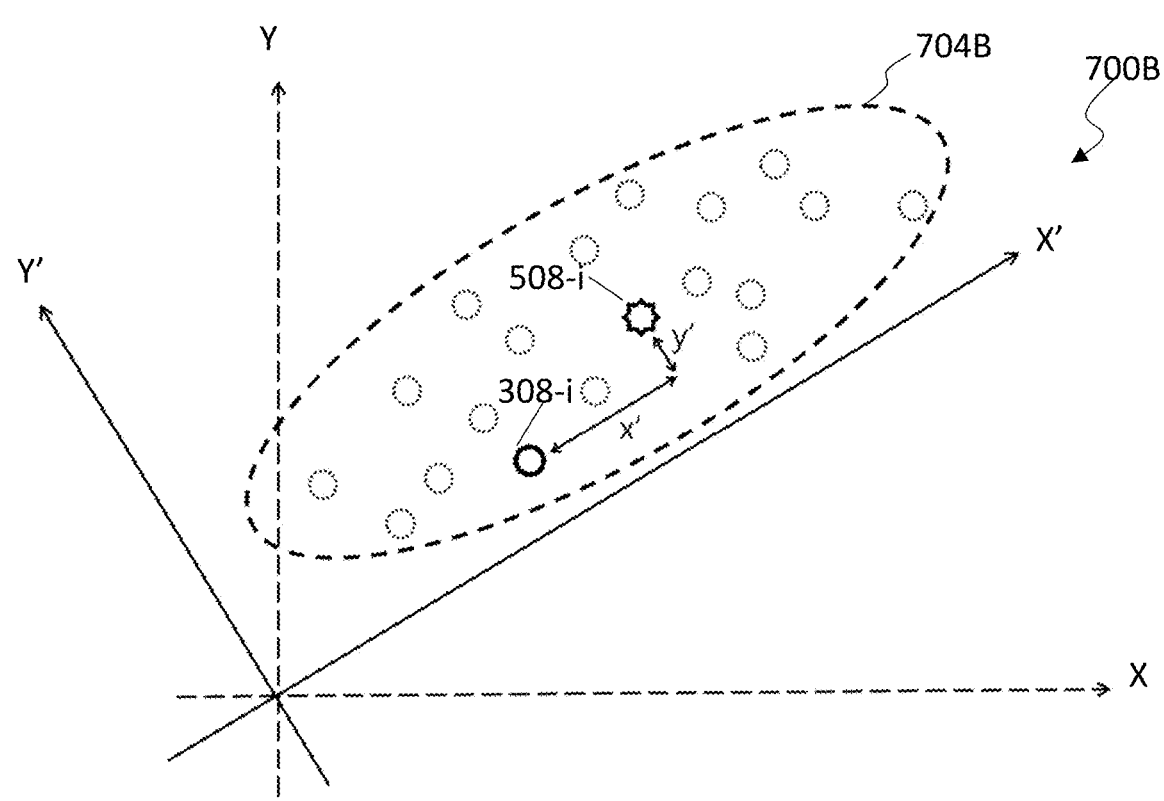
FIG. 7B is a simplified conceptual representation of a distribution of first intermediate encoded inputs and second intermediate encoded inputs in a vector space under a schematic example circumstance.

To address these circumstances, according to some other embodiments, novelty scoring includes normalized aggregation along a pathway (NAP). Solely to aid in understanding, a schematic representation of novelty scoring based on NAP is provided with respect to FIGS. 7A and 7B. FIG. 7A is a schematic representation of novelty scoring based on SAP, and FIG. 7B is a schematic representation of novelty scoring based on NAP. It will be appreciated that these non-limiting schematic representations are provided for illustrative purposes only to aid in understanding.

FIG. 7A is a schematic representation 700A of a distribution 704A including first intermediate encoded inputs 308-1, 308-2, ... 308-ℓ (FIG. 3) and second intermediate encoded inputs 508-1, 508-2, ... 508-ℓ. A pair of vectors represented as ($h_i$, $\hat{h}_i$), where $h_i(x)$ represents a vector from a first intermediate encoded input 308-i from an ith layer 204-i of the encoder g as described above with respect to FIG. 3, and $\hat{h}_i(x)$ represents vector from a second intermediate encoded input 508-i from the same ith layer 204-i of the encoder g as described above with respect to FIG. 5, are separated in a vector space having X and Y axes by distances x and y, respectively. To calculate a Euclidean distance between the pair of vectors, the component distances x and y are given about the same weight, such that the distance may be is calculated as $x^2 + y^2$, where equal weight is given to the component distances x and y in in X and Y directions, respectively. In the illustrated distribution 704A, first and second intermediate encoded inputs are spread relatively symmetrically in X and Y axes, and the component distances x and y are relatively similar in magnitude. Under these circumstances, calculating the distance between the pair of vectors as an unweighted Euclidean distance may not result in significant overemphasizing or underemphasizing a relative importance of the component distances x and y. However, when the first and second intermediate encoded inputs are spread unevenly in X and Y axes, the component distances x and y may be given different weights to prevent significant overemphasizing or underemphasizing the relative importance of the component offsets x and y. This is illustrated in FIG. 7B.

FIG. 7B is a schematic representation 700B of a distribution 704B including first intermediate encoded inputs 308-1, 308-2, ... 308-ℓ (FIG. 3) and second intermediate encoded inputs 508-1, 508-2, ... 508-ℓ. Unlike the distribution 704A of FIG. 7A, the distribution 704B includes first and second intermediate encoded inputs that are skewed and/or spread relatively unevenly in the vector space represented by X and Y axes. In the illustrated distribution 704B, the first and second intermediate encoded inputs are spread relatively asymmetrically in X and Y axes, and the component distances x and y are relatively large in magnitude. Under this circumstance, calculating the distance between the pair of vectors as an unweighted Euclidean distance may result in significant overemphasizing or underemphasizing a relative importance of the component offsets x and y. Under such circumstances, a normalization may be performed by one or both of orthogonalization and scaling. As illustrated in FIG. 7B, orthogonalization is performed by rotating the reference axes to X' and Y' to better match the major axes of the orientation of the data distribution. For example, in the illustrated example, one or more of the axes are in directions corresponding to greatest or smallest data variance. Based on the relatively smaller variance along the Y' compared to the X', a higher weight may be assigned to $y'^2$ when calculating the distance. This is because a relatively smaller displacement in the Y' direction may actually represent a higher degree of abnormality compared to a similar displacement in the X' direction.

Thus, normalizing the distances according to embodiments using the NAP method may be performed in two steps: orthogonalization and scaling. Let d(x) = h(x) − ĥ(x). Given a training set X, let D be a matrix whose i-th row corresponds to d(xi) for $x_i \in X$, and $\overline{D}$ the column-wise centered matrix of D. For the normalization, $\overline{D} = U\Sigma V^T$ or a singular value decomposition (SVD) of $\overline{D}$ is computed to obtain its singular values Σ and right singular vectors V. For a given data sample x, a novelty score function $s_{NAP}$ may be expressed as:

$$s_{NAP}(x) = \|(d(x) - \mu_X)^T V \Sigma^{-1}\|_2^2,$$

Where $\mu_X$ is the column-wise mean of D, d(x) is expressed as a column vector.

Computation of Hidden Reconstruction

Figure 8:
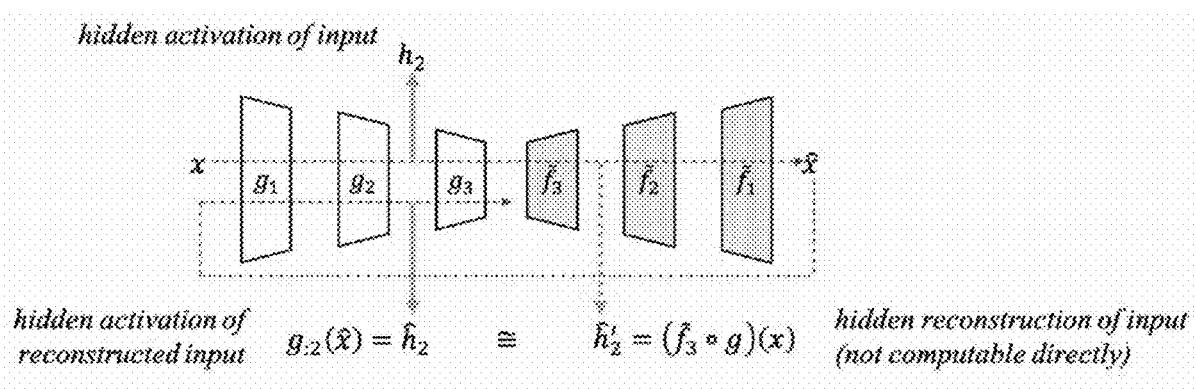
FIG. 8 schematically illustrates a method of processing a first encoded input, which may be generated by an encoder as illustrated in FIG. 3, through a plurality of decoder layers to generate one or more intermediate decoded outputs, according to embodiments.

It will be appreciated that there is no explicit correspondence between hidden layers in g and f, and as such two spaces defined by a pair of the corresponding hidden layers in g and f cannot be directly compared. Therefore, an intermediate reconstructed output from a hidden decoder layer that corresponds to an activated encoded layer may not be directly computed. Nevertheless, it can be shown that there is an indirect way to compute the intermediate reconstructed output from a hidden decoder layer without modifying an ordinary autoencoder or incorporating additional components. In particular, without being bound to any theory, it can be shown below with respect to FIG. 8 that $\hat{h}_i$ indeed corresponds to an intermediate reconstructed output.

In a similar manner as described above, let A=f∘g represent overall computation by an autoencoder, and $M_0=\{A(x): x \in \mathbb{R}^n\}$ be the low dimensional manifold that A describes, e.g.:

$$\forall x \in M_0, x = A(x)$$

Defining $M_i = \{g_{:i}(x) : x \in M_0\}$, which is the low dimensional image of $M_0$ defined by $g_{:i}$, $g$ and $f$ restricted on $M_0$ and $M\ell$, respectively, are inverse functions of each other. Let us assume that there exists a decoder $\tilde{f} = \tilde{f}_1 \circ \ldots \circ \tilde{f}\ell$ such that $$\forall x \in M\ell \; \tilde{f}(x) = f(x)$$

$$\forall h \in M_i, h = (g_{:i} \circ \tilde{f}_i)(h).$$

The second of the above conditions makes $\tilde{f}\ell_{:i+1}$ a proper decoder corresponding to $g_{i+1:}$, and then, the i-th hidden reconstruction $\hat{h}'_i(x)$ is defined by:

$$\hat{h}'_i(x) = (\tilde{f}\ell_{:i+1} \circ g_{i+1:})(h_i(x))$$

Thus, it can be concluded that $\hat{h}_i(x)$ is equal to $\hat{h}'_i(x)$ for $x \in M_0$ as follows:

$$\hat{h}'_i(x) = (\tilde{f}_{\ell:i+1} \circ g_{i+1:})(h_i(x)) = $$
$$(\tilde{f}_{\ell:i+1} \circ g)(x) = (g_{:i} \circ \tilde{f} \circ g)(x) = (g_{:i} \circ A)(x) = h_i(\hat{x}) = \hat{h}_i(x).$$

where $\tilde{f}_i$ is not needed for computation, but only $g_i$ and $f$. It will be noted that for $x \in M_0$ already on the manifold, its i-th hidden reconstruction $\hat{h}'_i(x)$ becomes equal to its hidden activation $h_i(x) = \hat{h}_i(x)$ for every $1 \leq i \leq \ell$: i.e., $h_i(x) = \hat{h}'_i(x)$ as $x = A(x)$. For $x \notin M_0$, its hidden reconstruction $\hat{h}'_i(x)$ will differ from its hidden activation $h_i(x)$.

Now, the existence of $\tilde{f}$ can be shown as follows. Since $x = A(x)$ for $x \in M_0$, $g_i$ and $f_i$ are one-to-one functions from $M_{i-1}$ and $M_i$, respectively. Defining $\tilde{f}_i = g_i^{-1}$ for $M_i$ and $\tilde{f} = \tilde{f}_1 \circ \ldots \circ \tilde{f}\ell$, it also holds $\tilde{f} = g^{-1}$. This implies $x = (\tilde{f} \circ g)(x)$ for $x \in M_0$, and consequently, $\tilde{f} = f$ on $M\ell$. This definition of $\tilde{f}_i$ satisfies the two conditions above, and as discussed, hidden reconstructions of an input, $\hat{h}'_i(x) = (\tilde{f}\ell_{:i+1} \circ g)(x)$ can be computed through computing the i-th hidden activation of the reconstructed input $\hat{x} = A(x)$, $\hat{h}_i(x)$.

The $\tilde{f}$ can be implemented in a neural network. Given $g_i$, if the symmetric architecture for $\tilde{f}_i$ is used, we may not be able to learn $\tilde{f}_i = g_i^{-1}$. Neural networks are, however, highly flexible frameworks in which we can deal with models of arbitrary function forms by adjusting network architecture. This property enables us to design a layer capable of representing $\tilde{f}_i$. For instance, even if $\tilde{f}_i$ is too complicated to be represented with a single fully connected layer, $\tilde{f}_i$ can still be approximated by stacking multiple layers. Hence, given $g_i$ and X, $\tilde{f}_i$ can be represented by neural networks.

Experimental Examples of Novelty Detection Using Intermediate Encoded Input from Hidden Layers In the following, experimental results from implementations of novelty detection methods according to embodiments are described, and the results are compared to those obtained using other methods. The novelty detection methods were tested on several benchmarks and diverse datasets collected from Kaggle repository and the University of Calif. at Irvine (UCI) Machine Learning Repository that are suitable for evaluating novelty detection methods.

The datasets from Kaggle and the UCI repositories are chosen from problem sets of anomaly detection and multi-class classification, as summarized in TABLE 1 below. It will be noted that MI-F and MI-V share the same feature matrix, but are considered to be different datasets because normal and abnormal labels are assigned by different columns, i.e., pairs of first and second vectors generated from the same encoder layers that have passed visual inspection, respectively. These datasets are used to compare the novelty detection methods according to embodiments against some other autoencoder-based methods.

TABLE 1

Description of Datasets Used in Experimental Evaluation.

| Name | # Samples | # Features | # Class | Domain | Novelty Target |
|---|---|---|---|---|---|
| MI-F | 25,286 | 58 | 2 | CNC milling | Machine not completed |
| MI-V | 23,125 | 58 | 2 | CNC milling | Workpiece out-of-spec |
| EOPT | 90,515 | 20 | 2 | Storage system | System failures |
| NASA | 4,687 | 33 | 2 | Astronomy | Hazardous asteroids |
| RARM | 20,221 | 6 | 2 | Robotics | Malfunctions |
| STL | 1,941 | 27 | 7 | Steel | Surface defects |
| OTTO | 61,878 | 93 | 9 | E-commerce | Types of products |
| SNSR | 58,509 | 48 | 11 | Electric Currents | Defective conditions |
| MNIST | 70,000 | 784 | 10 | Hand written digits | Digits |
| F-MNIST | 70,000 | 784 | 10 | Fashion articles | Articles |

To compare the novelty detection methods according to embodiments against some other recent novelty detection methods, some popular benchmark datasets are used, namely Mixed National Institute of Standards and Technology (MNIST) and Fashion MNIST (FMNIST). For these datasets, instead of taking pre-split training and test sets, they are merged for post-processing.

As described herein, novelty detection methods are configured to detect novel patterns in datasets by focusing on deviations from model-learned normal patterns. Thus, training datasets may contain essentially only normal samples, while the test datasets contain both normal and anomalous samples in the evaluation setups described herein. Thus, if a dataset contains anomaly labels, all samples in that dataset with such label are assigned to the test dataset. If a dataset does not have any anomaly label, the following two setups are considered:

Multimodal Normality: A single class is assigned as a novelty class and the remaining classes are assigned as a normal class. This setup is repeated to produce sub-datasets with all possible novelty assignments. For instance, MNIST results in a set of datasets with 10 different novelty classes.

Unimodal Normality: In contrast to the multimodal normality setup, one class is selected as a normal class, and the others are as novelty. For instance, MNIST results in a set of datasets with 10 different normal classes.

These two setups have been applied to STL, OTTO, SNSR, MNIST, and F-MNIST datasets. The novelty detection methods according to embodiments and other methods are compared using a metric known in the industry as Area Under Receiver Operating Characteristic (AUROC). It will be noted that thresholding-based metrics such as F1 score have not been employed because access to abnormal samples is only allowed during testing time. Hence, the focus has been on the separability of models for novelty with AUROC.

For the datasets summarized in TABLE 1, the effectiveness of the reconstruction error is compared for the SAP and NAP, for three different type of autoencoders, namely an autoencoder (AE), a variational autoencoder (VAE) and adversarial autoencoder (AAE). For the benchmark datasets, recent approaches including OCNN (Chalapathy et al., 2018), GPND (Pidhorskyi et al., 2018), DSVDD (Ruff et al., 2018) and GT (Golan & El-Yaniv, 2018) are available. To obtain the performances of the existing approaches, the respective codes have been downloaded and applied against the problem setups. Given novelty classes, the test sets are created by randomly selecting samples while maintaining novelty ratios to 35% for the multimodal and 50% for the unimodal normality setups, respectively. It is noted that the expectation value of AUROC is invariant to the novelty ratio.

Symmetric architecture with fully connected layers are used for the three base models, AE, VAE, and AAE. Each encoder and decoder has been provided with ten (10) layers with different bottleneck size. For the Kaggle and UCI datasets, PCA is carried out for each dataset first. The minimum number of principal components that explain at least 90% of the variance is selected as the bottleneck size of the autoencoders. The bottleneck size has been set to 20 for benchmark datasets. Leaky-ReLU (Xu et al., 2015) activation and batch normalization (Ioffe & Szegedy, 2015) layers are appended to all layers except the last layer.

The AE, VAE and AAE are trained with the Adam optimizer (Kingma & Ba, 2015), and the model with the lowest validation loss is selected as the best model. For training stability of VAE, ten (10) Monte Carlo samples were averaged in the "reparamterization trick" (Kingma & Welling, 2014) to obtain reconstruction from the decoder. In the calculation of SAP and NAP, reconstructions in the input space for MNIST and F-MNIST are excluded.

Each AUROC score is obtained by averaging AUROC scores from five trials to reduce the random errors in training neural networks. TABLE 2 summarizes the results of performance evaluation where the best score for each model is in shown in bold. Also, the best score for each dataset is shown with an underline. Since STL, OTTO, SNSR, MNIST, and F-MNIST do not have anomaly labels, their scores are averaged over all possible anomaly class assignments. For instance, the AUROC value for OTTO in the unimodal normality setup is the average of nine (9) AUROC values with different anomaly class assignments. In TABLE 2, the novelty detection method according to embodiments shows the highest AUROC scores for most of the cases. NAP is observed to be more effective with AE and VAE compared to AAE. In summary, the novelty detection method according to embodiments has been shown to achieve the best performance for 13 cases out of 15 (see the underlines).

TABLE 2

Comparison of AUROC for Different Novelty Detection Methods.

| Date | AE | | | VAE | | | AAE | | |
|---|---|---|---|---|---|---|---|---|---|
| | Recon | SAP | NAP | RECON | SAP | NAP | RECON | SAP | NAP |
| Multimodal Normality | | | | | | | | | |
| STL | 0.596 | 0.603 | 0.714 | 0.533 | 0.537 | 0.703 | 0.716 | 0.696 | 0.711 |
| OTTO | 0.620 | 0.630 | 0.662 | 0.598 | 0.615 | 0.620 | 0.620 | 0.635 | 0.668 |
| SNSR | 0.601 | 0.611 | 0.645 | 0.601 | 0.607 | 0.630 | 0.616 | 0.610 | 0.606 |
| MNIST | 0.825 | 0.881 | 0.899 | 0.864 | 0.907 | 0.927 | 0.847 | 0.911 | 0.929 |
| F-MNIST | 0.712 | 0.725 | 0.734 | 0.710 | 0.671 | 0.737 | 0.721 | 0.710 | 0.727 |
| Unimodal Normality | | | | | | | | | |
| MI-F | 0.694 | 0.755 | 0.707 | 0.455 | 0.392 | 0.540 | 0.663 | 0.759 | 0.704 |
| MI-V | 0.883 | 0.878 | 0.913 | 0.680 | 0.576 | 0.799 | 0.870 | 0.861 | 0.882 |
| EOPT | 0.650 | 0.648 | 0.627 | 0.604 | 0.580 | 0.594 | 0.594 | 0.585 | 0.624 |
| NASA | 0.662 | 0.614 | 0.665 | 0.582 | 0.519 | 0.676 | 0.719 | 0.716 | 0.724 |
| RARM | 0.647 | 0.630 | 0.665 | 0.655 | 0.635 | 0.678 | 0.665 | 0.667 | 0.684 |
| STL | 0.552 | 0.629 | 0.845 | 0.526 | 0.595 | 0.823 | 0.790 | 0.761 | 0.798 |
| OTTO | 0.675 | 0.680 | 0.749 | 0.626 | 0.612 | 0.741 | 0.738 | 0.729 | 0.752 |
| SNSR | 0.791 | 0.781 | 0.903 | 0.714 | 0.685 | 0.902 | 0.863 | 0.868 | 0.924 |
| MNIST | 0.972 | 0.980 | 0.979 | 0.957 | 0.954 | 0.976 | 0.972 | 0.966 | 0.977 |
| F-MNIST | 0.924 | 0.928 | 0.933 | 0.905 | 0.863 | 0.934 | 0.922 | 0.905 | 0.928 |

TABLE 3 summarizes the comparison of novelty detection methods according to embodiments to recent novelty detection methods. As described above with respect to TABLE 2, AUROC values are calculated by averaging results from ten (10) cases with different anomaly class assignments for both datasets. Except for the unimodal F-MNIST setup, NAP outperforms all competing methods regardless of base model choice. Even in the case where NAP scores did not win, the performance of RAPP is comparable to the best one, GT, which relies on image-specific data transformations.

TABLE 3

AUROC on benchmark datasets.

| Dataset | OCNN | GPND | DSVDD | GT | $NAP_{AE}$ | $NAP_{VAE}$ | $NAP_{AAE}$ |
|---|---|---|---|---|---|---|---|
| Multimodal Normality (Novelty Ratio: 35%) | | | | | | | |
| MNIST | 0.600 | 0.501 | 0.622 | 0.893 | 0.899 | 0.927 | 0.929 |
| F-MNIST | 0.609 | 0.691 | 0.610 | 0.725 | 0.734 | 0.737 | 0.727 |
| Unimodal Normality (Novelty Ratio: 50%) | | | | | | | |
| MNIST | 0.927 | 0.971 | 0.922 | 0.974 | 0.979 | 0.976 | 0.977 |
| F-MNIST | 0.915 | 0.917 | 0.923 | 0.935 | 0.933 | 0.934 | 0.928 |

Figure 9:
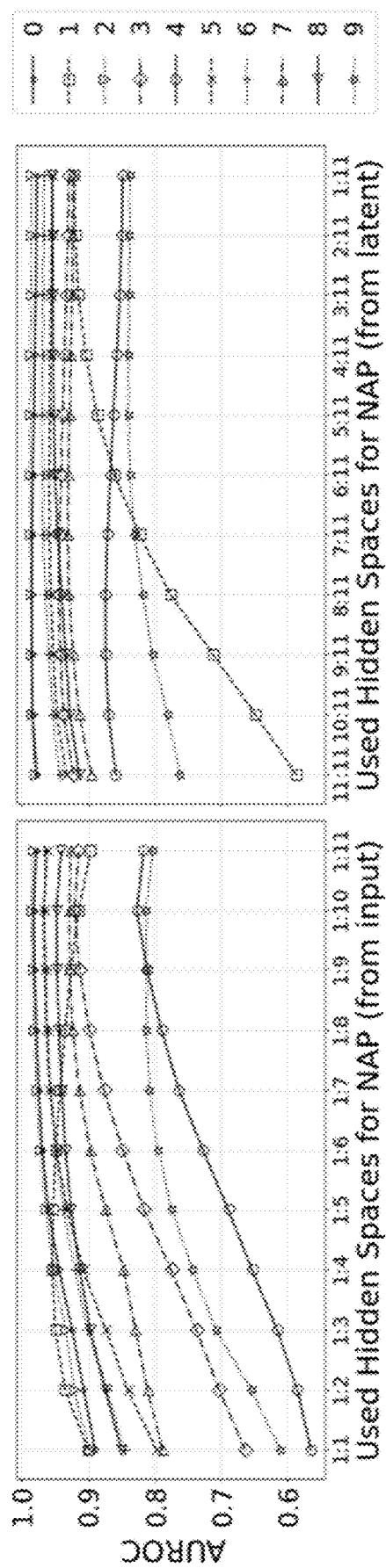
FIG. 9 illustrates graphs of novelty scores experimentally obtained using a novelty detection method according to embodiments in which the number of intermediate encoded inputs is varied.

FIG. 9 illustrate graphs of novelty scores experimentally obtained using a novelty detection method according to embodiments in which the number of intermediate encoded inputs is varied. In particular, each of the left and right graphs of FIG. 9 illustrates AUROC of NAP on MNIST as a function of the number of hidden reconstructions or intermediate encoded inputs used to calculate NAP for the multimodal normality setup as described above. Each label designated as a:b on the x-axis indicates that NAP is calculated with reconstructions in the a-th to b-th hidden spaces corresponding to a-th to b-th hidden layers. The a-th hidden space refers to the hidden space that is closest to the input space among the hidden spaces used and the b-th hidden space refers to the hidden space that is farthest from the input space (or closest to the bottleneck latent space) among the hidden spaces used. For For example, 1:11 indicates that NAP is calculated with reconstructions in all of the hidden spaces in the first to $11^{th}$ hidden spaces corresponding to first to ten hidden layers, except for the bottleneck latent space (space between the encoder and the decoder). The left graph corresponds to AUROC plotted as a function of a:b in which a=1, i.e., the first hidden space is always the hidden space that is the closest to the input side. For example, in the left graph, 1:5 corresponds to NAP calculated using hidden spaces starting with the hidden space corresponding to $g_1$ 204-1 (FIG. 2) and ending with the hidden space corresponding to $g_5$ 204-5 (FIG. 5). The right graph corresponds to AUROC plotted as a function of a:b in which b=11, i.e., the last hidden space is always the hidden space that is the closest to the bottleneck latent space or the farthest from the input space. For example, in the right graph, 5:11 corresponds to NAP calculated using hidden spaces starting with the hidden space corresponding to $g_5$ 204-5 (FIG. 2) and ending with the hidden space corresponding to $g_\ell$ 204-$\ell$ (FIG. 5), where $\ell$=11. The overall trend shows that the accuracy gets higher as more hidden reconstructions or encoded inputs are included for the NAP calculation. Another observation is that reconstructions in hidden spaces close to the input space are more discriminative for novelty compared to those close to the latent space.

Figure 10:
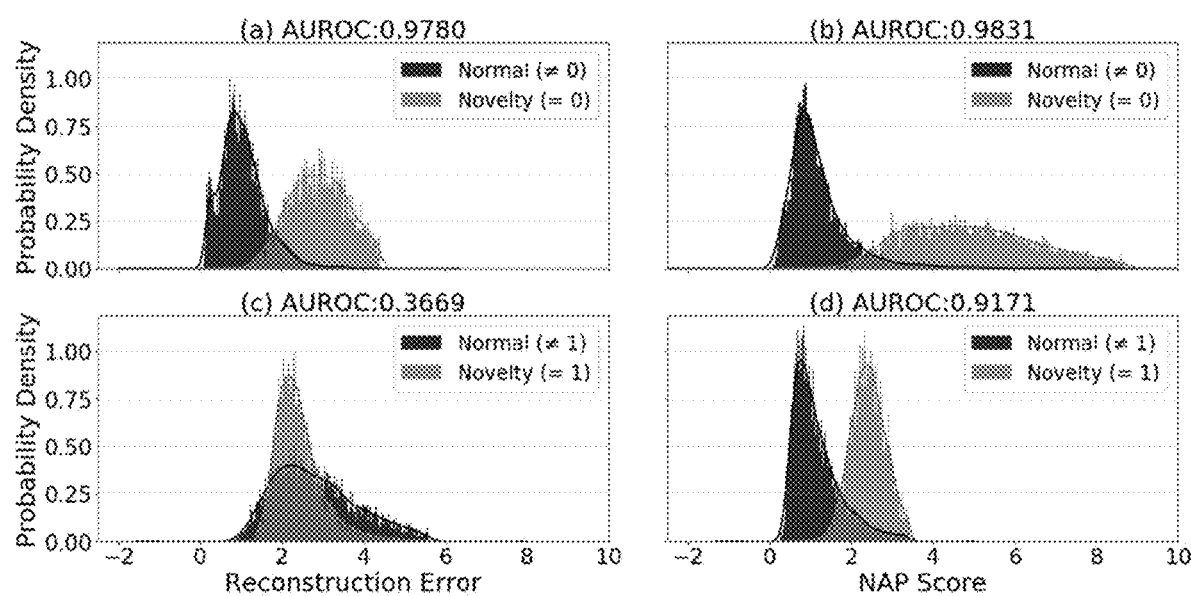
FIG. 10 illustrates graphs of distributions of novelty score experimentally obtained using a novelty detection method according to embodiments.

FIG. 10 illustrates graphs (a)-(d) of distributions of novelty score experimentally obtained using a novelty detection method according to embodiments. SAP and NAP show consistent performance across all digits for the multimodal normality case. To demonstrate this observation, FIG. 10 illustrate distributions of novelty scores for MNIST. The graphs (a) and (c) are distributions of reconstruction errors when novelty digits are 0 and 1, respectively. The graphs (b) and (d) are distributions of NAP scores when novelty digits are 0 and 1, respectively. In FIG. 10, the graphs (a) and (c) show distributions of the reconstruction errors when novelty digits are 0 and 1, respectively. As illustrated, when the digit 0 is designated as being novel, the distributions for normal and novel samples show relatively clear separation to produce a relatively high AUROC value of 0.9780. On the other hand, when the digit 1 is designated as being novel, the two distributions largely overlap, which results in a relatively low AUROC value of 0.3669. In FIG. 10, the graphs (b) and (d) show distributions of NAP scores when novelty digits are 0 and 1, respectively. In contrast to distributions of the reconstruction errors, distributions of the NAP scores show consistently clear separation regardless of whether digit 0 or digit 1 is designated as being novel. Comparing graphs (c) and (d), when the digit 1 is designated as being novel for MNIST, utilization of hidden reconstructions leads to a notable improvement over using reconstruction errors alone.

Considering that reconstruction error is associated with the distance between an original data sample and its projection onto the reconstruction space, we can infer, based on the observations discussed above with respect to FIG. 9, that data samples for digit 1 are located relatively closer to the reconstruction space, even though they are not part of the training set. Based on this inference, we provide further explanation below.

Let the set of normal digits be $C_{normal}$. Assuming that each normal digit c from MNIST has a feature set $S_c$ to characterize itself, the union of these feature sets defines a set of normal features S, $$S = \cup_c S_c \text{ where } c \in C_{normal}.$$

In the present application, S is approximated by a reconstruction space of an autoencoder trained with representative samples from all normal classes. Let this approximation be $\tilde{S}$. Let the set of novel digits be $C_{novel}$ and the feature set of a novelty digit a be $S_a$. In majority of the cases, we expect $S_a$ not to be a subset of $\tilde{S}$ because these novelty samples are not involved in training of the autoencoder. It should be noted that novelty detection is carried out by checking whether $S_a - \tilde{S} \neq \emptyset$. For the case where digit 1 is designated as the novel class, a hypothesis is that the feature set $S_1$ of digit 1 is similar to $S = \cap_c S_c$ where $c \in C_{normal}$ due to its simple shape: i.e., $|S_1 \backslash S| \approx 0$. Therefore, $S_1 \backslash \tilde{S}$ is likely to be an empty set as well, and thus, novelty detection will suffer in performance.

In contrast to conventional novelty detection methods based on measuring the reconstruction error that primarily investigate extremes of a projection pathway, the novelty detection method according to embodiments focuses on the entire sequence of the pathway to extract a fingerprint of a data sample from intermediate hidden reconstructions. This enables SAP and NAP to achieve more sophisticated characterization for data, and as a consequence, consistently high performance is obtained across various cases as shown above.

In summary, the novelty detection method according to embodiments effectively utilizes hidden reconstructions along a projection pathway of deep autoencoders. To this end, the concept of reconstruction in the input space is extended to hidden spaces of an autoencoder, and a tractable way to compute the hidden reconstructions is presented, which requires neither modifying nor retraining the autoencoder. The experimental results show that the methods according to embodiments outperform other competing methods in terms of AUROC for diverse datasets including popular benchmarks.

Applications of Novelty Detection Using Intermediate Encoded Input from Hidden Layers Novelty detection according to various embodiments can be particularly useful in systems, e.g., mission-critical systems, in which it may be possible to acquire a relatively large data set corresponding to a "normal" class for training a learning system of its behaviors or characteristics, while a data set corresponding to an "abnormal" class may be relatively scarce and therefore difficult to train the learning system of its behaviors or characteristics. Some example applications of novelty detection include, for example, manufacturing systems such as precision manufacturing systems, medical diagnostic systems such as mammograms, complex industrial systems such as faults and failure detection systems, structural detection systems for detecting structural damage, electronic security systems for detecting electronic intrusions, credit card or mobile phone fraud detection systems for detecting unusual usage behavior, video surveillance systems for detecting physical intrusions, mobile robotics, sensor networks, astronomy cataloguing systems and text mining systems, to name a few examples.

In various applications of the novelty detection methods according to embodiments, the training data set as well as the test data may be data obtained from sensors. For example, in a precision manufacturing environment, the input data for the neural networks described above may be obtained from sensors attached to manufacturing equipment that generates a large amount of data. Examples of sensor data that can be monitored using the methods described herein include plasma, temperature, pressure, humidity, gas, motion (e.g., speed), position, illumination or light, current, voltage, vibration, weight, visual appearance, substrate warpage, physical properties of materials (e.g., thickness, density, etc.), optical properties of materials (e.g., refractive index, absorbance, etc.) and particles, to name a few. Based on collected data from sensors, normal and abnormal states of manufacturing environment may be characterized, and anomalous patterns during operation can be detected, e.g., real-time, using various embodiments described herein.

By way of a specific example, semiconductor manufacturing environment is an example of precision manufacturing environment where an anomaly that is not detected timely can potentially cause costly loss of time and revenue. Because a typical semiconductor wafer manufacturing process flow includes tens or even hundreds of process steps, early detection of anomaly can be particularly important, as late detection may cause propagation of manufacturing anomaly over large portions of the process flow.

One of the difficulties associated with semiconductor manufacturing relates to frequently changing conditions a wafer is subjected to in a tool. Under some circumstances, the same tool runs multiple recipes. Under some other circumstances, the same recipe run on the same or different tools subjects wafers to variable process conditions. Regardless, because manufacturing excursions can be costly, strict process controls are implemented at various points during fabrication. As a result, "abnormal" data samples are relatively rare compared to "normal" data sets. Hence, multi-class classification techniques may not be practical for detecting such excursions. As a result, even under normal operation, sensor data collected during wafer processing can have different characteristics. In other words, there can be diverse "normal" states. To detect anomalies in such data, advanced techniques are needed to characterize heterogeneous normal data and distinguish abnormal patterns therefrom. The methods described herein advantageously provide sensitive novelty detection by additionally providing characterization of manufacturing processes from investigation of hidden information from a neural network.

By way of another example of precision manufacturing, automotive manufacturing is another area where anomaly detection may be critical. Compared to wafers in semiconductor industry, the while the volume of production may be smaller, the value of a single product is much greater. For instance, if a defect is found after assembling, the loss per unit can be as high as the full cost of the unit itself, e.g., a whole automobile that can cost over tens of thousands of dollars. In addition, safety requirements for critical components may be relatively stringent.

Similar to semiconductor manufacturing tools, equipment for car manufacturing also has installed therein many sensors. Also, similar to semiconductor manufacturing environment, the same manufacturing equipment may be used to manufacture various products. For instance, one equipment may manufacture different parts for different lines of vehicles, or the same or different equipment may manufacture nominally the same part for the same line of vehicles.

Another example of precision manufacturing where anomaly detection is critical may be energy storage device manufacturing, e.g., battery manufacturing. Undetected anomalies energy storage device manufacturing can be costly, and can cause injury from fire or explosion. As energy storage devices widely used across various industry sectors, e.g., in consumer-oriented products, detecting its abnormal behavior is critical.

Yet another example of precision manufacturing is pharmaceutical manufacturing. In contrast to general commodity products, pharmaceutical products have strict safety requirements. Elaborate anomaly detection schemes are necessary to identify subtle abnormal patterns.

Figure 11:
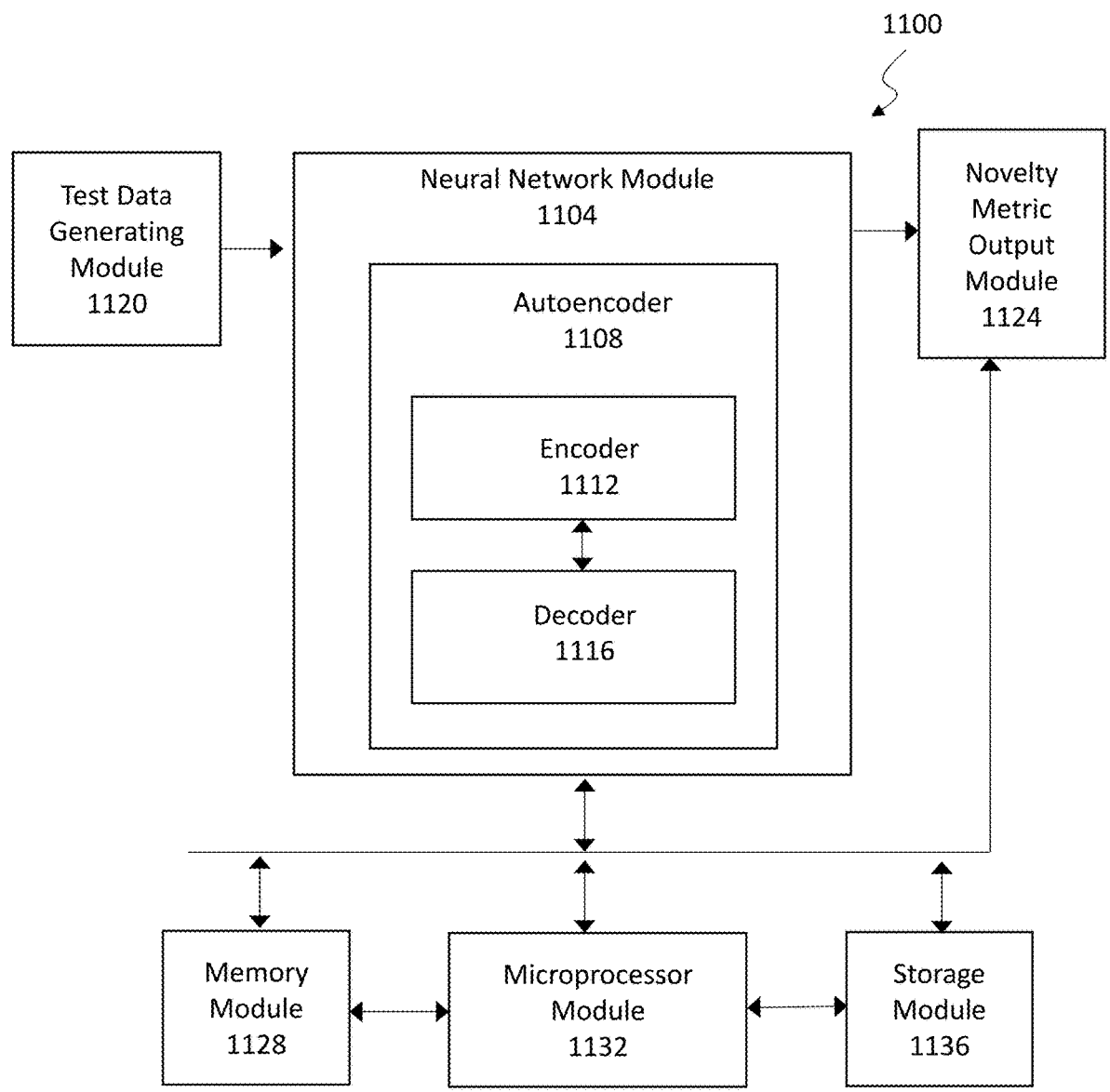
FIG. 11 schematically illustrates a functional block diagram of an electronic apparatus incorporating an autoencoder module having a deep learning architecture for detecting novelty, according to embodiments.

Systems and Apparatuses Configured for Novelty Detection Using Intermediate Encoded Input from Hidden Layers FIG. 11 schematically illustrates a functional block diagram of a system 1100 including an electronic apparatus for detecting novelty of a sensor data using a deep learning neural network model, according to embodiments. The apparatus comprises a deep learning neural network module 1104 comprising an autoencoder 1108. The autoencoder 1108 in turn comprises an encoder 1112 comprising a plurality of encoder layers and a decoder 1116 comprising a plurality of decoder layers. The apparatus is communicatively coupled to a test data generating module 1120 and configured to receive therefrom a first input comprising a sensor data and to successively process the first input through the plurality of encoder layers to generate a first encoded input. Successively processing the first input comprises generating a first intermediate encoded input from one of the encoder layers prior to generating the first encoded input. The decoder is configured to receive the first encoded input from the encoder and to successively process the first encoded input through the plurality of decoder layers to generate a first reconstructed output. The encoder is further configured to receive the first reconstructed output as a second input and to successively process the first reconstructed output through the plurality of encoder layers. Successively processing the first reconstructed output comprises generating a second intermediate encoded input from one of the encoder layers. The deep learning neural network module 1104 is configured to compute a novelty score of the first input using the first intermediate encoded input and the second intermediate encoded input. The electronic apparatus additionally includes a novelty metric output module 1124 configured to output the novelty score.

The neural network module 1104 is communicatively coupled to a memory module 1128, a microprocessor module 1132 and a storage module 1136. The memory module 1128, the microprocessor module 1132 and the storage module 1136 are communicatively connected to each other through, for example, a bus. In some embodiments, the neural network module 1104 can include a software code that that can be stored and/or executed locally, e.g., by a local microprocessor module 1132 and a local memory module 1128 and/or a local storage module 1136 of a local computing device. In some other embodiments, the software code can be stored and/or executed remotely, e.g., by a remote server microprocessor module 1132 and a remote memory module 1128 and/or a remote storage module 1132. The memory module 1128 can include memory devices such as a static random access memory (SRAM) and a dynamic random access memory (RAM). The memory devices can be configured as different levels of cache memory communicatively coupled to the microprocessor module 1132 through a memory bus that provides a data path for flow of data to and from the memory devices and the microprocessor module 1132. The storage module 470 is configured to permanently store data without power. In some implementations, the storage module 1136 includes storage media, such as a hard disk, a nonvolatile memory such as flash memory, read-only memory (ROM), among others.

As described above, unlike some novelty detection techniques, in the methods according to embodiments, one or more intermediate first encoded inputs 308-1, 308-2, . . . 308-$\ell$ (FIG. 3) are obtained by processing a first input 304 partly through the encoder. These intermediate first encoded inputs may advantageously be stored in, e.g., the memory module 1128 and/or the storage module 1136. Similarly, one or more of the intermediate second encoded inputs 508-1, 508-2, . . . 508-$\ell$ (FIG. 5) obtained by processing the first reconstructed output 404 may be stored in, e.g., the memory module 1128 and/or the storage module 1136. Subsequently, the stored intermediate second encoded inputs may be used, e.g., using the microprocessor module 1132 for determining novelty, e.g., by comparing against the corresponding ones of first encoded inputs 308-1, 308-2, . . . 308-$\ell$ (FIG. 3). Thus, the memory module 1128 and/or the storage module 1136 are configured to store both training data sets as well as test data sets, as well as the first input that is partly or fully processed by the autoencoder.

The test data generating module 1120 is configured to provide the first input to the neural network module 1104. The test data generating module 1120 can include any apparatus suitable for feeding the first input to be analyzed for novelty. For example, the test data generating module 1120 can include any of the sensors described above, which in turn may be communicatively coupled to an apparatus from which the sensor data may be generated, e.g., a manufacturing equipment. In this configuration, the first input can be a sensor data connected to the manufacturing equipment.

The novelty metric output module 1124 may be configured to output the novelty score of the first input using the first intermediate encoded input and the second intermediate encoded input generated by the deep learning neural network module 1104. The novelty score may be outputted in any suitable format, including textual, graphical or image format, onto any suitable output medium, e.g., a display device, paper or an electronic file.

It will be appreciated that each of the processes, methods, and algorithms described herein and/or depicted in the figures may be embodied in, and fully or partially automated by, code modules executed by one or more physical computing systems, hardware computer processors, application-specific circuitry, and/or electronic hardware configured to execute specific and particular computer instructions. For example, computing systems may include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some embodiments, particular operations and methods may be performed by circuitry that is specific to a given function.

Further, certain embodiments of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. In some embodiments, the non-transitory computer-readable medium may be part of one or more of the local processing and data module, the remote processing module, and remote data repository. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities may be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto may be performed in other sequences that are appropriate, for example, in serial, in parallel, or in some other manner. Tasks or events may be added to or removed from the disclosed example embodiments. Moreover, the separation of various system components in the embodiments described herein is for illustrative purposes and should not be understood as requiring such separation in all embodiments. It should be understood that the described program components, methods, and systems may generally be integrated together in a single computer product or packaged into multiple computer products.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein, but are to be accorded the widest scope consistent with this disclosure, the principles and the novel features disclosed herein.

What is claimed is:

1. A method implemented on an electronic device for detecting novelty of sensor data using a deep learning neural network model, the method comprising:

providing the deep learning neural network model comprising an autoencoder on an electronic device, the autoencoder comprising an encoder comprising a plurality of encoder layers and a decoder comprising a plurality of decoder layers;

feeding a first input comprising the sensor data into the encoder and successively processing the first input through the plurality of encoder layers to generate a first encoded input, wherein successively processing the first input comprises generating a first intermediate encoded input from one of the encoder layers prior to generating the first encoded input;

feeding the first encoded input into the decoder and successively processing the first encoded input through the plurality of decoder layers to generate a first reconstructed output;

feeding the first reconstructed output as a second input into the encoder and successively processing the first reconstructed output through the plurality of encoder layers, wherein successively processing the first reconstructed output comprises generating a second intermediate encoded input from one of the encoder layers;

wherein generating the first intermediate encoded input comprises generating a first vector and generating the second intermediate encoded input comprises generating a second vector, and wherein the first and second vectors have a lower dimension compared to the first input, and wherein the first intermediate encoded input and the second intermediate encoded input are generated from the same one of the encoder layers;

and computing a novelty score of the first input based on the first intermediate encoded input and the second intermediate encoded input, wherein computing the novelty score comprises computing a distance between the first vector and the second vector in a vector space; and outputting the novelty score.

2. The method of claim 1, wherein the first vector and the second vector have the same dimension.

3. The method of claim 1, wherein successively processing the first input through the plurality of encoder layers comprises generating a plurality of first vectors from a subset including at least some of the plurality of encoder layers, and wherein successively processing the first reconstructed output through the plurality of encoder layers comprises generating a plurality of second vectors from the subset including at least some of the plurality of encoder layers, and wherein computing the novelty score comprises aggregating a plurality of vector pairs which include first and second vectors.

4. The method of claim 3, wherein computing the novelty score further comprises computing distances between the plurality of vector pairs.

5. The method of claim 4, wherein computing the novelty score further comprises summing squares of the distances in the vector space.

6. The method of claim 4, wherein the first and second vectors are represented in the vector space having orthogonal axes, and wherein prior to computing the distances, the method comprises rotating the axes based on a distribution of the first and second vectors in the vector space.

7. The method of claim 6, wherein computing the distances between the plurality of vector pairs further comprises assigning different weights to each of at least two axes in different directions based on a distribution in the vector space of the plurality of vector pairs.

8. The method of claim 1, wherein the deep learning neural network model comprises the autoencoder that has been trained using a training dataset consisting essentially of data representing a single normal class.

9. The method of claim 8, wherein the training dataset comprises data such that a probability of the novelty score exceeding a novelty threshold is lower than 1%.

10. The method of claim 1, wherein the sensor data comprises manufacturing parameters collected from a manufacturing environment.

11. The method of claim 1, wherein the first reconstructed output is not further processed through remaining ones of the encoder layers or through the decoder after generating the second intermediate encoded input from the one of the encoder layers.

12. An electronic apparatus for detecting novelty of sensor data using a deep learning neural network model, the apparatus comprising:
the deep learning neural network module comprising an autoencoder, the autoencoder comprising an encoder comprising a plurality of encoder layers and a decoder comprising a plurality of decoder layers; and
a novelty metric output module,
wherein the encoder is configured to receive from a test data generating module a first input comprising the sensor data and to successively process the first input through the plurality of encoder layers to generate a first encoded input, wherein successively processing the first input comprises generating a first intermediate encoded input from one of the encoder layers prior to generating the first encoded input;
wherein the decoder is configured to receive the first encoded input from the encoder and to successively process the first encoded input through the plurality of decoder layers to generate a first reconstructed output;
wherein the encoder is further configured to receive the first reconstructed output as a second input and to successively process the first reconstructed output through the plurality of encoder layers, wherein successively processing the first reconstructed output comprises generating a second intermediate encoded input from one of the encoder layers,
wherein generating the first intermediate encoded input comprises generating a first vector and generating the second intermediate encoded input comprises generating a second vector, and wherein the first and second vectors have a lower dimension compared to the first input, and
wherein the first intermediate encoded input and the second intermediate encoded input are generated from the same one of the encoder layers;
wherein the deep learning neural network module is configured to compute a novelty score of the first input based on the first intermediate encoded input and the second intermediate encoded input, wherein computing the novelty score comprises computing a distance between the first vector and the second vector in a vector space; and
the novelty metric output module configured to output the novelty score.

13. A non-transitory computer-readable medium having stored thereon executable instructions that when executed cause a computing device to perform steps for detecting novelty of sensor data using a deep learning neural network model, the steps comprising:
providing the deep learning neural network model comprising an autoencoder on an electronic device, the autoencoder comprising an encoder comprising a plurality of encoder layers and a decoder comprising a plurality of decoder layers;
feeding a first input comprising the sensor data into the encoder and successively processing the first input through the plurality of encoder layers to generate a first encoded input, wherein successively processing the first input comprises generating a first intermediate encoded input from one of the encoder layers prior to generating the first encoded input;
feeding the first encoded input into the decoder and successively processing the first encoded input through the plurality of decoder layers to generate a first reconstructed output;
feeding the first reconstructed output as a second input into the encoder and successively processing the first reconstructed output through the plurality of encoder layers, wherein successively processing the first reconstructed output comprises generating a second intermediate encoded input from one of the encoder layers,
wherein generating the first intermediate encoded input comprises generating a first vector and generating the second intermediate encoded input comprises generating a second vector, and wherein the first and second vectors have a lower dimension compared to the first input, and
wherein the first intermediate encoded input and the second intermediate encoded input are generated from the same one of the encoder layers; and
computing a novelty score of the first input based on the first intermediate encoded input and the second intermediate encoded input, wherein computing the novelty score comprises computing a distance between the first vector and the second vector in a vector space; and
outputting the novelty score.

* * * * *